(12) United States Patent
Huang et al.

(10) Patent No.: US 12,394,317 B2
(45) Date of Patent: Aug. 19, 2025

(54) AUTOMATIC EVENT CAPTURING FOR AUTONOMOUS VEHICLE DRIVING

(71) Applicant: PlusAI, Inc., Santa Clara, CA (US)

(72) Inventors: Xiaoyu Huang, San Jose, CA (US); Amit Kumar, Sunnyvale, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/808,066

(22) Filed: Aug. 18, 2024

(65) Prior Publication Data
US 2025/0124783 A1    Apr. 17, 2025

Related U.S. Application Data

(60) Provisional application No. 63/544,425, filed on Oct. 16, 2023, provisional application No. 63/636,090, filed on Apr. 18, 2024.

(51) Int. Cl.
G08G 1/01    (2006.01)
B60W 60/00    (2020.01)

(52) U.S. Cl.
CPC ......... *G08G 1/0129* (2013.01); *B60W 60/001* (2020.02)

(58) Field of Classification Search
CPC .................................................. G08G 1/0129
See application file for complete search history.

(56) References Cited

U.S. PATENT DOCUMENTS

| | | | |
|---|---|---|---|
| 11,094,191 B2 | 8/2021 | Luzifovich | |
| 11,537,767 B2 * | 12/2022 | Fuerst | .............. G08G 1/0145 |
| 11,620,906 B2 | 4/2023 | Hu | |
| 11,747,806 B1 * | 9/2023 | Wootton | ................ G08G 1/161 |
| | | | 701/28 |
| 12,033,495 B2 | 7/2024 | Bartkowiak | |
| 12,110,035 B2 * | 10/2024 | Fahoum | ................ B60W 50/06 |
| 2013/0138320 A1 | 5/2013 | Aso | |
| 2019/0244518 A1 | 8/2019 | Cheng | |
| 2020/0074852 A1 | 3/2020 | Hu | |
| 2022/0126864 A1 * | 4/2022 | Moustafa | .............. G06T 1/0007 |

(Continued)

OTHER PUBLICATIONS

Huang, Office Action, U.S. Appl. No. 18/808,069, Oct. 23, 2024, 20 pgs.

(Continued)

*Primary Examiner* — Michael A Berns

(74) *Attorney, Agent, or Firm* — Morgan, Lewis & Bockius LLP

(57) ABSTRACT

This application is directed to collecting event-based vehicle traffic data to facilitate driving a vehicle. A computer system includes sensors that are positioned on a fixed installation at a road, one or more processors, and memory. The computer system monitors, using the plurality of sensors on the fixed installation, vehicle traffic data (e.g., associated with one or more events) in a zone of interest of the road over a period of time to generate historical traffic data. The computer system uses the historical traffic data to train a driving model of an at least partially autonomous vehicle. The computer system sends the driving model to one or more vehicles. The driving model is configured to be used by the one or more vehicles to at least partially autonomously drive in a first trajectory while the one or more vehicles are traveling through a similar zone of interest.

20 Claims, 10 Drawing Sheets

(56) References Cited

U.S. PATENT DOCUMENTS

2022/0340163 A1  10/2022  Geraldy
2023/0316908 A1  10/2023  Kreidieh
2024/0304083 A1   9/2024  Gordon

OTHER PUBLICATIONS

Huang, Office Action, U.S. Appl. No. 18/808,067, Oct. 22, 2024, 16 pgs.

* cited by examiner

800

A computer system includes a plurality of sensors that are positioned on a fixed installation at a road, one or more processors, and memory. The computer system may include one or more distinct systems located at distinct locations of the road 802 Monitor, by the plurality of sensors on the fixed installation, vehicle traffic data in a zone of interest of the road over a period of time to generate historical traffic data 804 Determine whether a first event has occurred 806 Determine that the vehicle traffic data satisfies a first set of criteria 808 Compare the vehicle traffic data against a set of predefined rules to determine whether the vehicle traffic data satisfies a rule of the set of predefined rules 810 Input the vehicle traffic data into a deep neural network that is configured to determine whether the vehicle traffic data satisfies one or more criteria for occurrence of the first event 812 In accordance with a determination that the first event has occurred, trigger recording via the plurality of sensors; generate event data based on the recording; and add the event data to a corpus of data to generate the historical traffic data 814 Temporarily store road condition monitoring data corresponding to a pre-defined buffer period. Triggering recording of the first event includes adding at least a portion of the temporarily stored road condition monitoring data to the first event recording

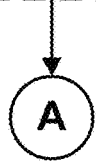

Figure 8A

AUTOMATIC EVENT CAPTURING FOR AUTONOMOUS VEHICLE DRIVING

RELATED APPLICATIONS

This application claims priority to (i) U.S. Provisional Application No. 63/544,425, filed Oct. 16, 2023, titled "Motion Controlling for Autonomous Vehicles" and (ii) U.S. Provisional Application No. 63/636,090, filed Apr. 18, 2024, titled "Centralized Prediction and Planning Using V2X for Lane Platooning and Intersection Vehicle Behavior Optimizations and Lane Change Decision-Making by Combining Infrastructure and Vehicle Intelligence," each of which is hereby incorporated by reference herein in its entirety.

This application is related to the following applications, all of which are incorporated by reference herein in their entireties:
- U.S. patent application Ser. No. 18/808,067, filed Aug. 18, 2024, titled "Detecting Road and Weather Conditions for Vehicle Driving"; and
- U.S. patent application Ser. No. 18/808,069, filed Aug. 18, 2024, titled "Motion Planning for Autonomous Vehicle Driving Using Vehicle-to-Infrastructure Communication."

TECHNICAL FIELD

The present application generally relates to vehicle technology, and more particularly to, methods, systems, and non-transitory computer readable storage media for collecting vehicle traffic data that can be used onboard or offboard to improve decision making in autonomous vehicles.

BACKGROUND

Vehicles are now capable of self-driving with different levels of autonomy. Each of these levels is characterized by the relative amount of human and autonomous control. For example, The Society of Automotive Engineers (SAE) defines 6 levels of driving automation ranging from 0 (fully manual) to 5 (fully autonomous). These levels have been adopted by the U.S. Department of Transportation. Autonomous vehicles provide numerous advantages including: (1) lowering the number of vehicles on the roads, (2) more predictable and safer driving behavior than human driven vehicles, (3) less emissions if there are fewer vehicles on the road, and if they are electrically powered, (4) improved travel efficiency, fuel economy, and traffic safety if they are controlled by computers, (5) increased lane capacity, (6) shorter travel times, and (7) increased mobility for users who are incapable of diving.

There are numerous advantages of autonomous vehicles, including: (1) lowering the number of vehicles on the roads (most privately owned vehicles are driven a small fraction of the time); (2) more predictable and safer driving behavior than human driven vehicles; (3) less emissions if more vehicles are electrically powered; (4) improved fuel efficiency; (5) increased lane capacity; (6) shorter travel times; and (7) mobility for users who are incapable of diving.

One of the key obstacles facing the autonomous vehicle industry is the complexity and unpredictability of road and traffic conditions. This makes it difficult to train autonomous vehicles for every possible rare condition or event that the vehicle may encounter while driving. For example, occasionally, human drivers may need to react to extraordinary or rare events, such as a package falling off a truck or a lane closure. In these situations, human drivers are often able to instinctively react to avoid harm to themselves and their vehicle, but unless the autonomous driving model has been trained for such a rare event, the vehicle may not know how to react.

Currently, autonomous vehicles are equipped with sensors that are primarily used for object (e.g., obstacle) detection. Fleet operators often collect large amounts of data from individual vehicles in order to learn from existing road and traffic conditions. However, these data tend to be limited only to the perception of the individual vehicles. It would be beneficial to have a mechanism to utilize the large amounts of data collected from individual vehicles in a productive manner.

SUMMARY

Some embodiments of the present disclosure are directed to methods, systems, and non-transitory computer readable storage media for collecting vehicle traffic associated with events to facilitate autonomous vehicle driving. In accordance with some embodiments of this application is a realization that road agent models and traffic models can be applied on large scale simulation platforms to utilize information of large area detection coverage of a road (e.g., an entire segment of a freeway, or an intersection zone, or a lane merge zone). Particularly, data should be recorded in an automatic and selective way to avoid having to analyze large amounts of repetitive data. In accordance with some embodiments of this application is a realization that systems and methods for automatically identifying target events and collecting relevant event data for use in improving onboard or offboard decision making algorithms applied by autonomous vehicles. The relevant event data may be applied to develop road agent models and traffic models on large scale simulation platforms in a reliable and cost-effective manner.

According to some aspects of the present disclosure, sensors are disposed at a fixed installation (e.g., an infrastructure, having at a fixed location), and configured to directly monitor and gather data (e.g., traffic-related parameters). For example, an installation may be located at an on-ramp area of a road, at a lane-merge area, or at a road intersection. Compared to data collected by individual vehicles using vehicle sensors, traffic information collected by the sensors disposed at the fixed installation tend to be more detailed and instantaneous. The sensors disposed at the fixed installation may be statically (e.g., fixedly or immovably) positioned, have better detection coverage, and focus on a fixed area of a road.

As disclosed, in some embodiments, the fixed installation includes a data processing unit that is attached to the installation. The data processing unit is configured to process data collected by the sensors disposed at the fixed installation, including automatically capturing driving scenarios or "events" that are associated with complex decision making processes such as collision avoidance, post-accident reaction, and negotiation among different traffic streams. As used herein, in some embodiments, an event refers to a situation that can impact the driving decision of an autonomous vehicle.

As disclosed, in some embodiments, the data processing unit executes an automatic scenario capturing system that is configured to implement tasks for one or more of event detection, scenario classification, data abstraction, and data transmission. In some instances, vehicles involved in the scenario have the option to receive the scenario data immediately (e.g., at no cost). In some embodiments, data captured from an event can be stored in a cloud-based data pool, which can be shared to autonomous driving entities (e.g., as a data service).

Accordingly, the systems and/or methods disclosed herein advantageously improve decision making modules in autonomous vehicles by continuously generating training data of driving scenarios at a fairly low cost. Not only is the data collected by sensors positioned at a fixed installation of high quality, but it is also particularly suited for developing large-scale road agent models and traffic models. Relevant sensor data are selectively stored and streamed to a server that trains an autonomous vehicle driving model, thereby conserving resources (e.g., memory space and communication bandwidth).

In one aspect, a method for automatic event capturing is implemented at a computer system that includes a plurality of sensors that are positioned on a fixed installation at a road, one or more processors, and memory. The method incudes monitoring, by the plurality of sensors on the fixed installation, vehicle traffic data in a zone of interest of the road over a period of time to generate historical traffic data. The method includes using the historical traffic data to train a driving model of an at least partially autonomous vehicle. The method also includes sending the driving model to one or more vehicles, where the driving model is configured to be used by the one or more vehicles to at least partially autonomously drive in a first trajectory while the one or more vehicles are traveling through a similar zone of interest.

In some embodiments, monitoring the vehicle traffic data in the zone of interest of the road includes, in accordance with a determination that a first event has occurred: triggering recording of the first event via the plurality of sensors; generating event data based on the recording; and adding the event data to a corpus of data to generate the historical traffic data.

In some embodiments, the method includes temporarily storing road condition monitoring data corresponding to a pre-defined buffer period. Triggering recording of the first event includes adding at least a portion of the temporarily stored road condition monitoring data to the first event recording.

In some embodiments, the recording comprises a first data format. Generating the event data based on the recording includes converting the recording having the first data format to the event data having a second data format that is different from the first data format.

In some embodiments, the method includes receiving vehicle operational data from one or more vehicles that are traveling in the zone of interest of the road over the period of time, and using the vehicle operational data to generate the historical traffic data.

In some embodiments, the first event involves a first vehicle. The method further includes transmitting the recording of the first event to the first vehicle.

According to another aspect of the present application, a computer system includes a plurality of sensors that are positioned on a fixed installation at a road, one or more processors, and memory coupled to the one or more processors. The memory storing instructions that, when executed by the one or more processors, cause the computer system to perform any of the methods for automatic event capturing as disclosed herein.

According to another aspect of the present application, a non-transitory computer readable storage medium stores instructions configured for execution by a computer system that includes a plurality of sensors that are positioned on a fixed installation at a road, one or more processors, and memory. The instructions, when executed by the one or more processors, cause the computer system to perform any of the methods for automatic event capturing as disclosed herein.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

The accompanying drawings, which are included to provide a further understanding of the embodiments, are incorporated herein, constitute a part of the specification, illustrate the described embodiments, and, together with the description, serve to explain the underlying principles.

FIGS. 8A to 8C provide a flowchart of an example process for automatic event capturing, in accordance with some embodiments.

Like reference numerals refer to corresponding parts throughout the several views of the drawings.

DETAILED DESCRIPTION

Figure 1:
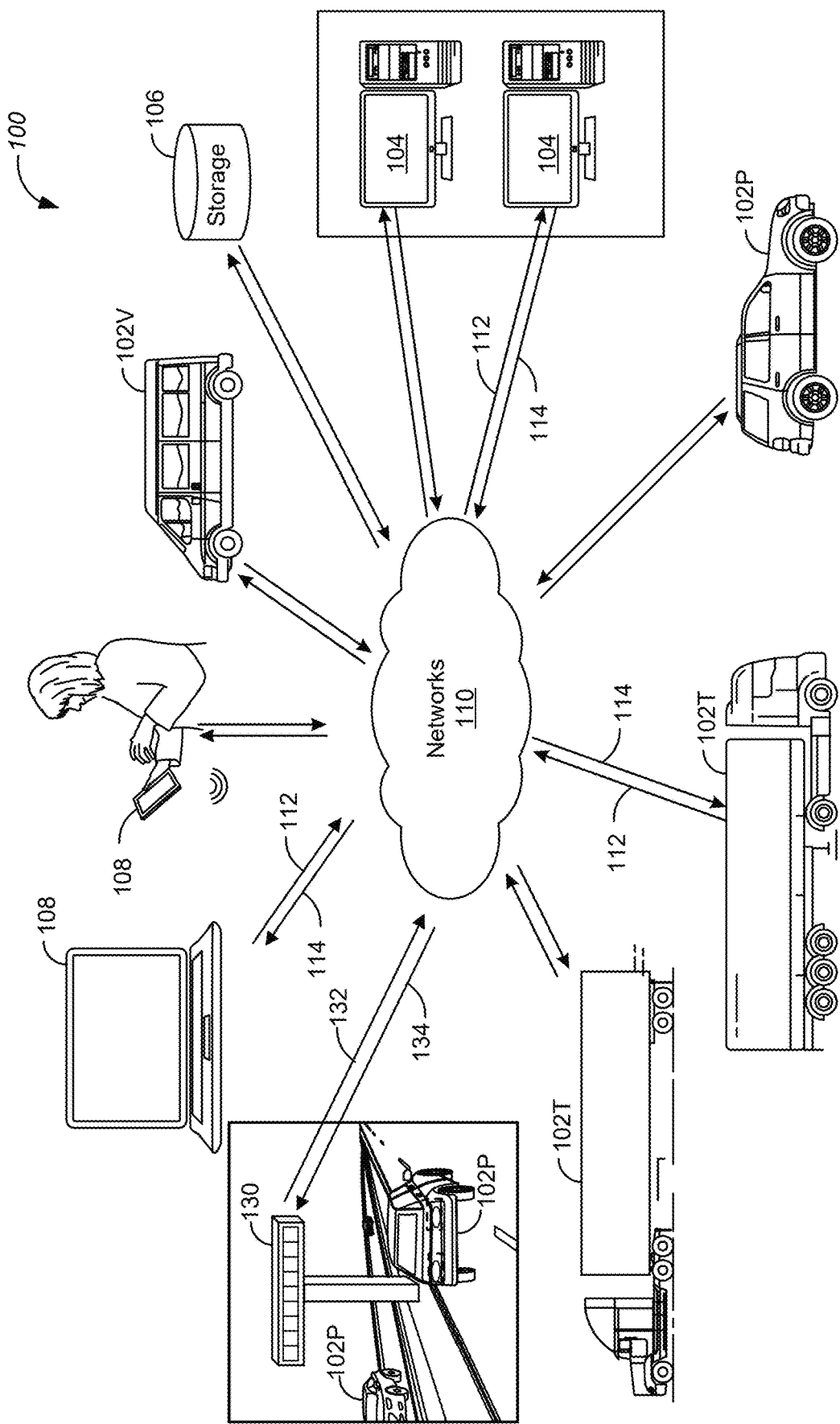
FIG. 1 is an example vehicle driving environment for a plurality of vehicles, in accordance with some embodiments.

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of the claims and the subject matter may be practiced without these specific details. For example, it will be apparent to one of ordinary skill in the art that the subject matter presented herein can be implemented on many types of electronic devices with digital video capabilities.

Various embodiments of this application are directed to collecting event-related vehicle traffic data that can be used in onboard or offboard decision making by autonomous vehicles. In some embodiments, an event refers to a situation that impacts the driving decision of an autonomous vehicle. In some embodiments, a computer system includes a plurality of sensors that are positioned on a fixed installation (e.g., an infrastructure) at a road, one or more processors, and memory. In some embodiments, the computer system (e.g., a microcontroller unit) is physically co-located at the fixed installation. In some embodiments, the computer system includes one or more distinct systems located at distinct locations of the road. For example, multiple installations, each having respective sensors, may be positioned along a stretch of a road (e.g., at intervals of every one kilometer, three kilometers, or five kilometers).

The plurality of sensors can include one or more cameras, one or more microphones, one or more inductive loop detectors, a radio detection and ranging (RADAR) sensor, an infrared sensor, and one or more ultrasonic sensors. The computer system monitors (e.g., continuously, periodically, at regular intervals), using the plurality of sensors on the fixed installation, vehicle traffic data in a zone of interest of the road over a period of time to generate historical traffic data.

In some embodiments, the computer system receives vehicle operational data from one or more vehicles that are traveling in the zone of interest of the road over the period of time (e.g., via a wireless communication network, such as a 5G network and uses the vehicle operational data to generate the historical traffic data. The computer system uses the historical traffic data to at least partially train a driving model of an at least partially autonomous vehicle. The computer system sends the driving model to one or more vehicles, where the driving model is configured to be used by the one or more vehicles to at least partially autonomously drive in a first trajectory while the one or more vehicles are traveling through a similar zone of interest.

In some embodiments, the computer system monitors the vehicle traffic data in the zone of interest of the road. In accordance with a determination (e.g., by the computer system) that a first event has occurred, the computer system triggers (e.g., automatically, without user intervention) recording of the first event via the plurality of sensors, generates event data based on the recording, and adds the event data to a corpus of data to generate the historical traffic data. In some embodiments, the computer system determines that the first event has occurred when the vehicle traffic data satisfies a first set of (e.g., one or more) criteria. In some embodiments, the computer system determines that the first event has occurred by comparing the vehicle traffic data against a set of predefined rules to determine whether the vehicle traffic data satisfies a rule of the set of predefined rules. In some embodiments, the computer system determines that the first event has occurred by inputting the vehicle traffic data into a deep neural network that is configured to determine whether the vehicle traffic data satisfies one or more criteria for occurrence of the first event.

In some embodiments, generating the event data based on the recording includes selecting, for a respective vehicle of one or more vehicles in the first event, a respective value from a predetermined set of values (e.g., values such as "1", "2", and "3") for a first index (e.g., a vehicle behavior change index) corresponding to a behavior of the respective vehicle in the first event. In some embodiments, determining the aggregated value includes aggregating one or more respective values for the first index, from the one or more vehicles in the first event, to obtain the aggregated value. In some embodiments, in accordance with a determination that the aggregated value satisfies a threshold value, the computer system retains the recording and generates the event data based on the recording.

FIG. 1 is an example vehicle driving environment 100 having a plurality of vehicles 102 (e.g., vehicles 102P, 102T, and 102V), in accordance with some embodiments. Each vehicle 102 has one or more processors, memory, a plurality of sensors, and a vehicle control system. The vehicle control system is configured to sense the vehicle driving environment 100 and drive on roads having different road conditions. The plurality of vehicles 102 may include passenger cars 102P (e.g., sport-utility vehicles and sedans), vans 102V, trucks 102T, and driver-less cars. Each vehicle 102 can collect sensor data and/or user inputs, execute user applications, present outputs on its user interface, and/or operate the vehicle control system to drive the vehicle 102. The collected data or user inputs can be processed locally (e.g., for training and/or for prediction) at the vehicle 102 and/or remotely by one or more servers 104. The one or more servers 104 provide system data (e.g., boot files, operating system images, and user applications) to the vehicle 102, and in some embodiments, process the data and user inputs received from the vehicle 102 when the user applications are executed on the vehicle 102. In some embodiments, the vehicle driving environment 100 further includes storage 106 for storing data related to the vehicles 102, servers 104, and applications executed on the vehicles 102.

For each vehicle 102, the plurality of sensors includes one or more of: (1) a global positioning system (GPS) sensors; (2) a light detection and ranging (LiDAR) scanner; (3) one or more cameras; (4) a radio detection and ranging (RADAR) sensor; (5) an infrared sensor; (6) one or more ultrasonic sensors; (7) a dedicated short-range communication (DSRC) module; (8) an inertial navigation system (INS) including accelerometers and gyroscopes; (9) an inertial measurement unit (IMU) for measuring and reporting acceleration, orientation, angular rates, and other gravitational forces; and/or (10) an odometry sensor. In some embodiments, a vehicle 102 includes a 5G communication module to facilitate vehicle communication jointly with or in place of the DSRC module. The cameras are configured to capture a plurality of images in the vehicle driving environment 100, and the plurality of images are applied to map the vehicle driving environment 100 to a 3D vehicle space and identify a location of the vehicle 102 within the environment 100. The cameras also operate with one or more other sensors (e.g., GPS, LiDAR, RADAR, and/or INS) to localize the vehicle 102 in the 3D vehicle space. For example, the GPS identifies a geographical position (geolocation) of the vehicle 102 on the Earth, and the INS measures relative vehicle speeds and accelerations between the vehicle 102 and adjacent vehicles 102. The LiDAR scanner measures the distance between the vehicle 102 and adjacent vehicles 102 and other objects. Data collected by these sensors is used to determine vehicle locations determined from the plurality of images or to facilitate determining vehicle locations between two images.

The vehicle control system includes a plurality of actuators for at least steering, braking, controlling the throttle (e.g., accelerating, maintaining a constant velocity, or decelerating), and transmission control. Depending on the level of automation, each of the plurality of actuators (or manually controlling the vehicle, such as by turning the steering wheel) can be controlled manually by a driver of the vehicle, automatically by the one or more processors of the vehicle, or jointly by the driver and the processors. When the vehicle 102 controls the plurality of actuators independently or jointly with the driver, the vehicle 102 obtains the sensor data collected by the plurality of sensors, identifies adjacent road features in the vehicle driving environment 100, tracks the motion of the vehicle, tracks the relative distance between the vehicle and any surrounding vehicles or other objects, and generates vehicle control instructions to at least partially autonomously control driving of the vehicle 102. Conversely, in some embodiments, when the driver takes control of the vehicle, the driver manually provides vehicle control instructions via a steering wheel, a braking pedal, a throttle pedal, and/or a gear lever directly. In some embodiments, a vehicle user application is executed on the vehicle and configured to provide a user interface. The driver provides vehicle control instructions to control the plurality of actuators of the vehicle control system via the user interface of the vehicle user application. By these means, the vehicle 102 is configured to drive with its own vehicle control system and/or the driver of the vehicle 102 according to the level of autonomy.

In some embodiments, autonomous vehicles include, for example, a fully autonomous vehicle, a partially autonomous vehicle, a vehicle with driver assistance, or an autonomous capable vehicle. Capabilities of autonomous vehicles can be associated with a classification system, or taxonomy, having tiered levels of autonomy. A classification system can be specified, for example, by industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention) as classified by the International Society of Automotive Engineers (SAE International). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator or a remote operator. The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

In some embodiments, the vehicle 102 drives in the vehicle driving environment 100 at level 5. The vehicle 102 collects sensor data from the plurality of sensors, processes the sensor data to generate vehicle control instructions, and controls the vehicle control system to drive the vehicle autonomously in response to the vehicle control instructions. Alternatively, in some situations, the vehicle 102 drives in the vehicle driving environment 100 at level 0. The vehicle 102 collects the sensor data and processes the sensor data to provide feedback (e.g., a warning or an alert) to a driver of the vehicle 102 to allow the driver to drive the vehicle 102 manually and based on the driver's own judgement. Alternatively, in some situations, the vehicle 102 drives in the vehicle driving environment 100 partially autonomously at one of levels 1-4. The vehicle 102 collects the sensor data and processes the sensor data to generate a vehicle control instruction for a portion of the vehicle control system and/or provide feedback to a driver of the vehicle 102. The vehicle 102 is driven jointly by the vehicle control system of the vehicle 102 and the driver of the vehicle 102. In some embodiments, the vehicle control system and driver of the vehicle 102 control different portions of the vehicle 102. In some embodiments, the vehicle 102 determines the vehicle status. Based on the vehicle status, a vehicle control instruction of one of the vehicle control system or driver of the vehicle 102 preempts or overrides another vehicle control instruction provided by the other one of the vehicle control system or driver of the vehicle 102.

For the vehicle 102, the sensor data collected by the plurality of sensors, the vehicle control instructions applied to the vehicle control system, and the user inputs received via the vehicle user application form a collection of vehicle data 112. In some embodiments, at least a subset of the vehicle data 112 from each vehicle 102 is provided to one or more servers 104. A server 104 provides a central vehicle platform for collecting and analyzing the vehicle data 112, monitoring vehicle operation, detecting faults, providing driving solutions, and updating additional vehicle information 114 to individual vehicles 102 or client devices 108. In some embodiments, the server 104 manages vehicle data 112 of each individual vehicle 102 separately. In some embodiments, the server 104 consolidates vehicle data 112 from multiple vehicles 102 and manages the consolidated vehicle data jointly (e.g., the server 104 statistically aggregates the data).

Additionally, in some embodiments, the vehicle driving environment 100 further includes one or more client devices 108, such as desktop computers, laptop computers, tablet computers, and mobile phones. Each client device 108 is configured to execute a client user application associated with the central vehicle platform provided by the server 104. The client device 108 is logged into a user account on the client user application, and the user account is associated with one or more vehicles 102. The server 104 provides the collected vehicle data 112 and additional vehicle information 114 (e.g., vehicle operation information, fault information, or driving solution information) for the one or more associated vehicles 102 to the client device 108 using the user account of the client user application. In some embodiments, the client device 108 is located in the one or more vehicles 102, while in other embodiments, the client device is at a location distinct from the one or more associated vehicles 102. As such, the server 104 can apply its computational capability to manage the vehicle data 112 and facilitate vehicle monitoring and control on different levels (e.g., for each individual vehicle, for a collection of vehicles, and/or for related client devices 108).

The plurality of vehicles 102, the one or more servers 104, and the one or more client devices 108 are communicatively coupled to each other via one or more communication networks 110, which is used to provide communications links between these vehicles and computers connected together within the vehicle driving environment 100. The one or more communication networks 110 may include connections, such as a wired network, wireless communication links, or fiber optic cables. Examples of the one or more communication networks 110 include local area networks (LAN), wide area networks (WAN) such as the Internet, or a combination thereof. The one or more communication networks 110 are, in some embodiments, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol. A connection to the one or more communication networks 110 may be established either directly (e.g., using 3G/4G/5G connectivity to a wireless carrier), or through a network interface (e.g., a router, a switch, a gateway, a hub, or an intelligent, dedicated whole-home control node), or through any combination thereof. In some embodiments, the one or more communication networks 110 allow for communication using any suitable protocols, like Transmission Control Protocol/Internet Protocol (TCP/IP). In some embodiments, each vehicle 102 is communicatively coupled to the servers 104 via a cellular communication network.

In some embodiments, deep learning techniques are applied by the vehicles 102, the servers 104, or both, to process the vehicle data 112. For example, in some embodiments, after image data is collected by the cameras of one of the vehicles 102, the image data is processed using an object detection model to identify objects (e.g., road features including, but not limited to, vehicles, lane lines, shoulder lines, road dividers, traffic lights, traffic signs, road signs, cones, pedestrians, bicycles, and drivers of the vehicles) in the vehicle driving environment 100. In some embodiments, additional sensor data is collected and processed by a vehicle control model to generate a vehicle control instruction for controlling the vehicle control system. In some embodiments, a vehicle planning model is applied to plan a driving control process based on the collected sensor data and the vehicle driving environment 100. The object detection model, vehicle control model, and vehicle planning model are collectively referred to herein as vehicle data processing models (i.e., machine learning models 250 in FIG. 2), each of which includes one or more neural networks. In some embodiments, such a vehicle data processing model is applied by the vehicles 102, the servers 104, or both, to process the vehicle data 112 to infer associated vehicle status and/or provide control signals. In some embodiments, a vehicle data processing model is trained by a server 104, and applied locally or provided to one or more vehicles 102 for inference of the associated vehicle status and/or to provide control signals. Alternatively, a vehicle data processing model is trained locally by a vehicle 102, and applied locally or shared with one or more other vehicles 102 (e.g., by way of the server 104). In some embodiments, a vehicle data processing model is trained in a supervised, semi-supervised, or unsupervised manner.

In some embodiments, the vehicle driving environment 100 further includes one or more installations 130 (e.g., an infrastructure) that are situated along a road. For example, in some embodiments, the installations 130 can positioned at locations along a road where traffic may be prone to buildup, such as a freeway entrance or exit, a lane merge zone (e.g., on a section of a road where two or more lanes merge), a tunnel, a toll booth, a traffic light area, an on-ramp region of a highway, and/or a junction (e.g., an intersection) where two or more roads converge, diverge, meet or cross. In some embodiments, a segment of a road can have multiple installations 130 that are positioned at regular intervals (e.g., every kilometer, every mile, every 2 miles, etc.) along the road. In some embodiments, the installations 130 comprise fixed, immovable structures. In some embodiments, the installations 130 are positioned ahead of traffic of interest (e.g., the vehicles are driving in a direction toward the installations).

The one or more installations 130, the plurality of vehicles 102, the one or more servers 104, and the one or more client devices 108 are communicatively coupled to each other via the one or more communication networks 110. In some embodiments, a vehicle 102 can be equipped with a vehicle-to-infrastructure (V2I) communication system, in which the vehicle 102 and the one of more installations 130 are communicating nodes that provide each other with information such as traffic information, weather information, road condition information, and safety warnings. In accordance with some embodiments, V2I involves the exchange of information between vehicles 102 and components (e.g., sensors 660, communication module 616, data processing module 626, and other components) of an installation 130. In some embodiments, a respective vehicle 102 can be equipped with a vehicle-to-everything (V2X) communication system, in which the respective vehicle 102 can exchange information with the one of more installations 130 as well as with other vehicles that may be driving along the same road (e.g., route), or a different road, as the respective vehicle 102. The V2I and/or V2X communication system can be powered using 3G/4G/5G connectivity to a wireless carrier, or through a network interface (e.g., a router, a switch, a gateway, a hub, or an intelligent, dedicated whole-home control node), or through any combination thereof. In some embodiments, the V2I or V2X communication are powered by 5G, which advantageously allows large bandwidth, low latency information sharing between the vehicles and the installations, providing new opportunities for road condition estimation and weather conditions perception.

The installations 130 include one or more sensors 660 positioned at the installations 130. The sensors 660 are fixedly located on the installations 130 and are configured to detect, monitor, and gather data on various traffic-related parameters (e.g., vehicle traffic data, including traffic density, an average vehicle speed, honking/beeping from vehicles). In accordance with some embodiments of the present disclosure, the information collected by the sensors 660 are more detailed and instantaneous compared to information collected using a perception system on a single autonomous vehicle, because they have a fixed location, better detection coverage, and a defined field of view. In some embodiments, the one or more sensors incudes one or more of: an imaging sensor, a camera, a microphone (which may be part of the camera or separate from the camera), an anemometer (e.g., a wind speed and direction sensor), a global positioning system (GPS), a thermal sensor (e.g., a temperature sensor), an acoustic sensor, a microphone, a light detection and ranging (LiDAR) scanner, a radio detection and ranging (RADAR) sensor, an infrared sensor, an ultrasonic sensor. In some embodiments, the installations 130 include one or more inductive loop detectors for transmitting and receiving communication signals, and/or detecting the presence or vehicles.

In some embodiments, a respective installation 130 includes a communication module for facilitating information sharing between the vehicles 102 and the installation 130. For example, in some embodiments, the installation 130 gathers, from the vehicles 102 via the communication module, vehicle information 134. The vehicle information 134 can include information about vehicle dynamics (e.g., vehicle velocities and accelerations), vehicle data 112, and/or the additional vehicle information 114. In some embodiments, the vehicle information 134 can also include traffic, road, and/or weather information that are communicated from the vehicles 102 to the installation 130.

In some embodiments, the installation 130 provides at least a subset of infrastructure information 132 to the vehicles 102 and/or the one or more servers 104. The infrastructure information 132 can include sensor data collected by the sensors 660 and/or data processed by a computing unit of the installation 130 based on the sensor data and the vehicle information 134.

It is noted that the installation 130 illustrated in FIG. 1 does not reflect an actual size of the installation 130. In some embodiments, the installation 130 corresponds to an existing structure (e.g., a light pole, a billboard) standing near or on the road. Alternatively, in some embodiments, the installation 130 is a dedicated structure built at a fixed location near or on the road for collecting information of local road or whether conditions. The installation 130 may not be visible or discernable to passing vehicles from its appearance.

Figure 2:
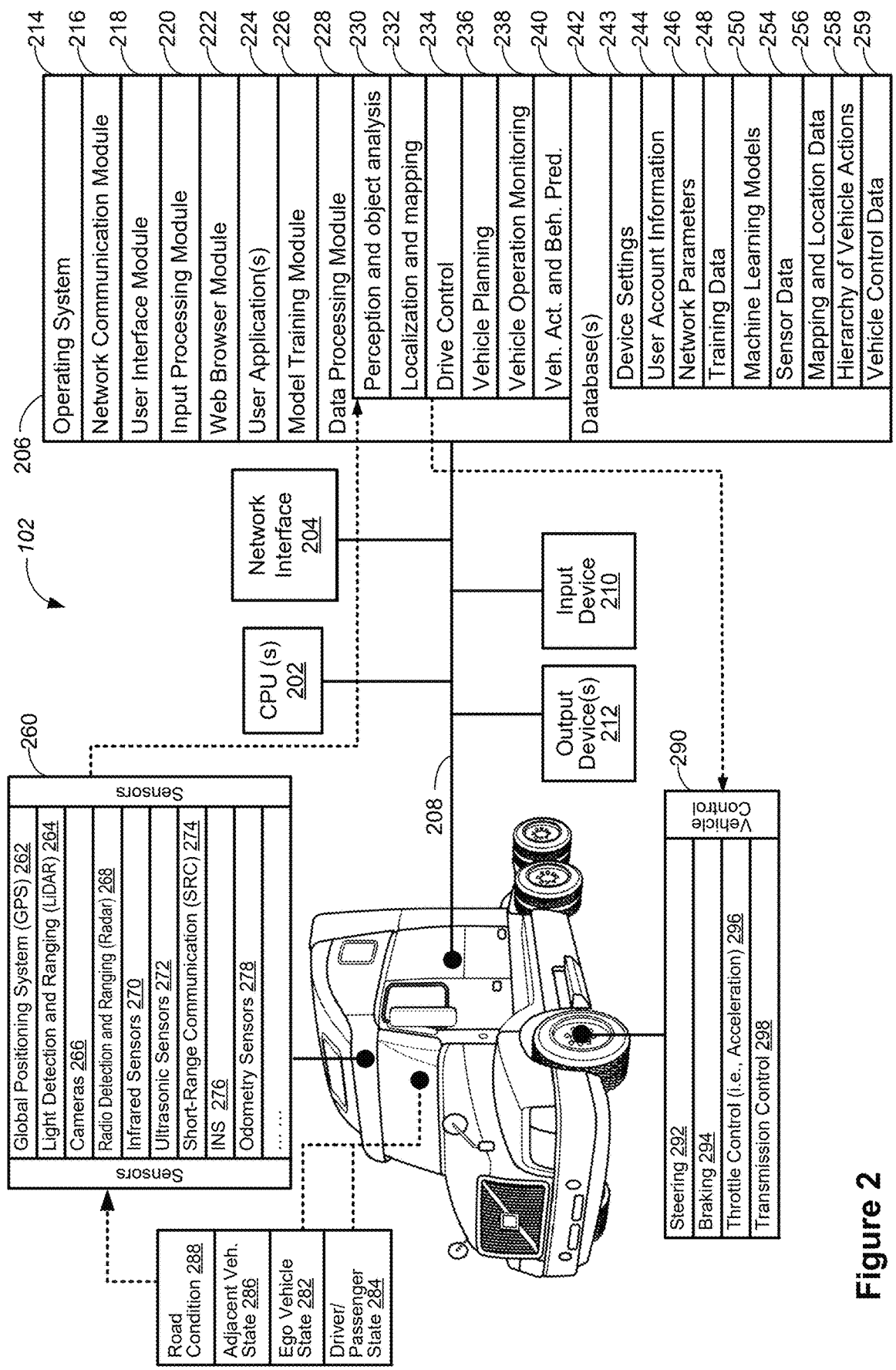
FIG. 2 is a block diagram of an example vehicle configured to be driven with a certain level of autonomy, in accordance with some embodiments.

FIG. 2 is a block diagram of an example vehicle 102 configured to be driven with a certain level of autonomy, in accordance with some embodiments. The vehicle 102 typically includes one or more processing units (CPUs) 202, one or more network interfaces 204, memory 206, and one or more communication buses 208 for interconnecting these components (sometimes called a chipset). The vehicle 102 includes one or more user interface devices. The user interface devices include one or more input devices 210, which facilitate user input, such as a keyboard, a mouse, a voice-command input unit or microphone, a touch screen display, a touch-sensitive input pad, a gesture capturing camera, or other input buttons or controls. Furthermore, in some embodiments, the vehicle 102 uses a microphone and voice recognition or a camera and gesture recognition to supplement or replace the keyboard. In some embodiments, the one or more input devices 210 include one or more cameras, scanners, or photo sensor units for capturing images, for example, of a driver and a passenger in the vehicle 102. The vehicle 102 also includes one or more output devices 212, which enable presentation of user interfaces and display content, including one or more speakers and/or one or more visual displays (e.g., a display panel located near to a driver's right hand in right-hand-side operated vehicles typical in the U.S.).

The vehicle 102 includes a plurality of sensors 260 configured to collect sensor data in a vehicle driving environment 100. The plurality of sensors 260 include one or more of a GPS 262, a LiDAR scanner 264, one or more cameras 266, a RADAR sensor 268, an infrared sensor 270, one or more ultrasonic sensors 272, an SRC module 274, an INS 276 including accelerometers and gyroscopes, and an odometry sensor 278. The GPS 262 localizes the vehicle 102 in Earth coordinates (e.g., using a latitude value and a longitude value) and can reach a first accuracy level less than 1 meter (e.g., 30 cm). The LiDAR scanner 264 uses light beams to estimate relative distances between the scanner 264 and a target object (e.g., another vehicle 102), and can reach a second accuracy level better than the first accuracy level of the GPS 262. The cameras 266 are installed at different locations on the vehicle 102 to monitor surroundings of the camera 266 from different perspectives. In some situations, a camera 266 is installed facing the interior of the vehicle 102 and configured to monitor the state of the driver of the vehicle 102. The RADAR sensor 268 emits electromagnetic waves and collects reflected waves to determine the speed and a distance of an object over which the waves are reflected. The infrared sensor 270 identifies and tracks objects in an infrared domain when lighting conditions are poor. The one or more ultrasonic sensors 272 are used to detect objects at a short distance (e.g., to assist parking). The SRC module 274 is used to exchange information with a road feature (e.g., a traffic light). The INS 276 uses the accelerometers and gyroscopes to measure the position, the orientation, and the speed of the vehicle. The odometry sensor 278 tracks the distance the vehicle 102 has travelled, (e.g., based on a wheel speed). In some embodiments, based on the sensor data collected by the plurality of sensors 260, the one or more processors 202 of the vehicle monitor its own vehicle state 282, the driver or passenger state 284, states of adjacent vehicles 286, and road conditions 288 associated with a plurality of road features.

The vehicle 102 has a control system 290, including a steering control 292, a braking control 294, a throttle control 296, a transmission control 298, signaling and lighting controls, and other controls. In some embodiments, one or more actuators of the vehicle control system 290 are automatically controlled based on the sensor data collected by the plurality of sensors 260 (e.g., according to one or more of the vehicle state 282, the driver or passenger state 284, states of adjacent vehicles 286, and/or road conditions 288).

The memory 206 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 206 includes one or more storage devices remotely located from one or more processing units 202. The memory 206, or alternatively the non-volatile the memory within the memory 206, includes a non-transitory computer readable storage medium. In some embodiments, the memory 206, or the non-transitory computer readable storage medium of the memory 206, stores the following programs, modules, and data structures, or a subset or superset thereof:

- an operating system 214, which includes procedures for handling various basic system services and for performing hardware dependent tasks;
- a network communication module 216, which connects each vehicle 102 to other devices (e.g., another vehicle 102, a server 104, or a client device 108) via one or more network interfaces (wired or wireless) and one or more communication networks 110, such as the Internet, other wide area networks, local area networks, metropolitan area networks, and so on;
- a user interface module 218, which enables presentation of information (e.g., a graphical user interface for an application 224, widgets, websites and web pages thereof, audio content, and/or video content) at the vehicle 102 via one or more output devices 212 (e.g., displays or speakers);
- an input processing module 220, which detects one or more user inputs or interactions from one of the one or more input devices 210 and interprets the detected input or interaction;
- a web browser module 222, which navigates, requests (e.g., via HTTP), and displays websites and web pages thereof, including a web interface for logging into a user account of a user application 224 associated with the vehicle 102 or another vehicle;
- one or more user applications 224, which are executed at the vehicle 102. The user applications 224 include a vehicle user application that controls the vehicle 102 and enables users to edit and review settings and data associated with the vehicle 102;
- a model training module 226, which trains a machine learning model 250. The model 250 includes at least one neural network and is applied to process vehicle data (e.g., sensor data and vehicle control data) of the vehicle 102;

a data processing module 228, which performs a plurality of on-vehicle tasks, including, but not limited to, perception and object analysis 230, vehicle localization and environment mapping 232, vehicle drive control 234, vehicle drive planning 236, local operation monitoring 238, and vehicle action and behavior prediction 240;

a vehicle database 242, which stores vehicle data 112, including:

device settings 243, including common device settings (e.g., service tier, device model, storage capacity, processing capabilities, communication capabilities, and/or medical procedure settings) of the vehicle 102;

user account information 244 for the one or more user applications 224 (e.g., user names, security questions, account history data, user preferences, and predefined account settings);

network parameters 246 for the one or more communication networks 110, (e.g., IP address, subnet mask, default gateway, DNS server, and host name);

training data 248 for training the machine learning model 250;

machine learning models 250 for processing vehicle data 112, where in some embodiments, the machine learning model 250 is applied to process one or more images captured by a first vehicle 102A and predict a sequence of vehicle actions of a second vehicle through a hierarchy of interconnected vehicle actions;

sensor data 254 captured or measured by the plurality of sensors 260;

mapping and location data 256, which is determined from the sensor data 254 to map the vehicle driving environment 100 and locations of the vehicle 102 in the environment 100;

a hierarchy of interconnected vehicle actions 258 including a plurality of predefined vehicle actions that are organized to define a plurality of vehicle action sequences; and vehicle control data 259, which is automatically generated by the vehicle 102 or manually input by the user via the vehicle control system 290 based on predicted vehicle actions to drive the vehicle 102.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 206 stores a subset of the modules and data structures identified above. In some embodiments, the memory 206 stores additional modules and data structures not described above.

Figure 3:
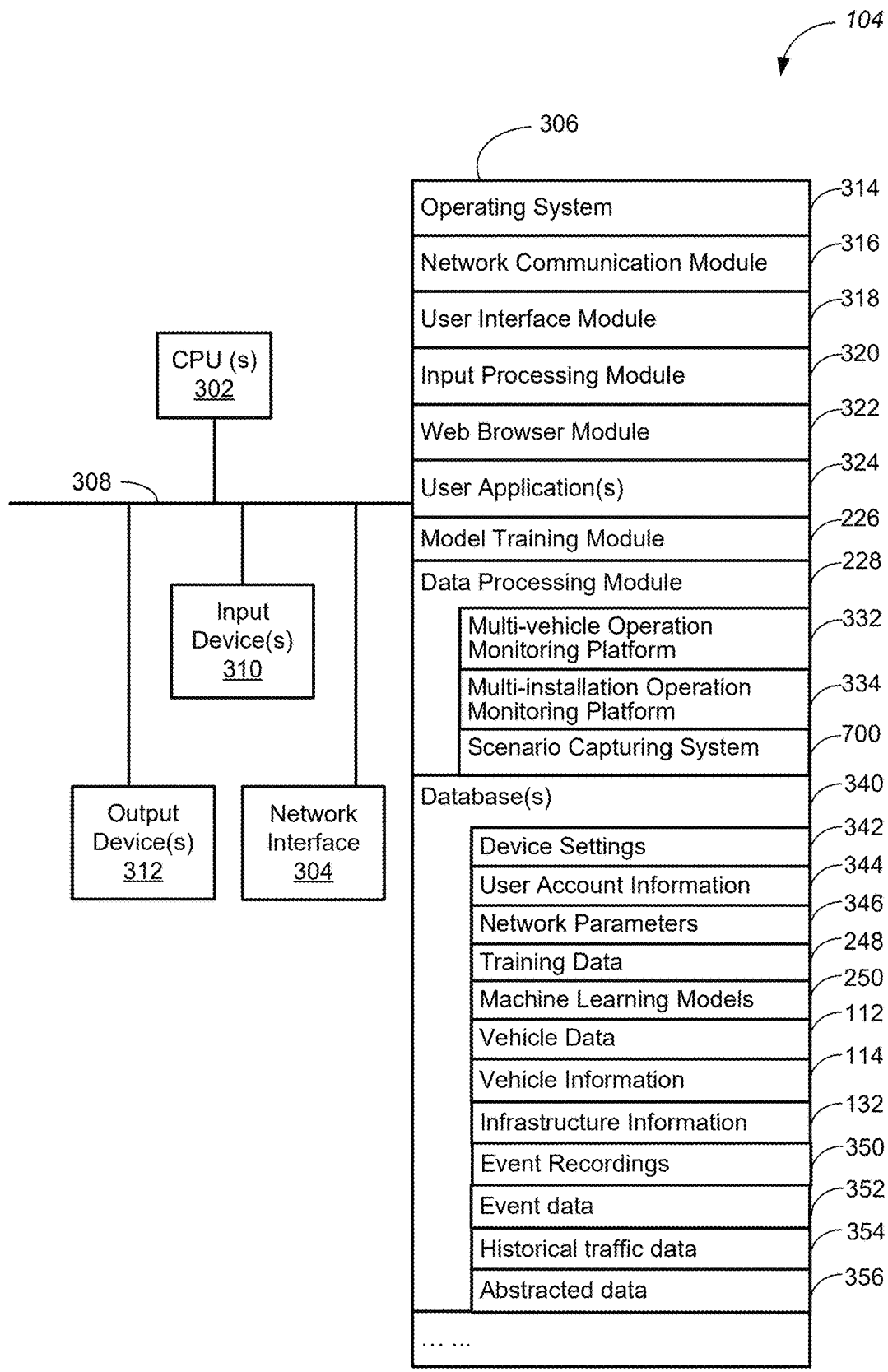
FIG. 3 is a block diagram of an example server for monitoring and managing vehicles in a vehicle driving environment, in accordance with some embodiments.

FIG. 3 is a block diagram of a server 104 for monitoring and managing vehicles 102 in a vehicle driving environment (e.g., the environment 100 in FIG. 1), in accordance with some embodiments. Examples of the server 104 include, but are not limited to, a server computer, a desktop computer, a laptop computer, a tablet computer, or a mobile phone. The server 104 typically includes one or more processing units (CPUs) 302, one or more network interfaces 304, memory 306, and one or more communication buses 308 for interconnecting these components (sometimes called a chipset). The server 104 includes one or more user interface devices. The user interface devices include one or more input devices 310, which facilitate user input, such as a keyboard, a mouse, a voice-command input unit or microphone, a touch screen display, a touch-sensitive input pad, a gesture capturing camera, or other input buttons or controls. Furthermore, in some embodiments, the server 104 uses a microphone and voice recognition or a camera and gesture recognition to supplement or replace the keyboard. In some embodiments, the one or more input devices 310 include one or more cameras, scanners, or photo sensor units for capturing images, for example, of graphic serial codes printed on electronic devices. The server 104 also includes one or more output devices 312, which enable presentation of user interfaces and display content, including one or more speakers and/or one or more visual displays.

The memory 306 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 306 includes one or more storage devices remotely located from one or more processing units 302. The memory 306, or alternatively the non-volatile memory within memory 306, includes a non-transitory computer readable storage medium. In some embodiments, the memory 306, or the non-transitory computer readable storage medium of the memory 306, stores the following programs, modules, and data structures, or a subset or superset thereof:

an operating system 314, which includes procedures for handling various basic system services and for performing hardware dependent tasks;

a network communication module 316, which connects the server 104 to other devices (e.g., vehicles 102, another server 104, and/or client devices 108) via one or more network interfaces (wired or wireless) and one or more communication networks 110, such as the Internet, other wide area networks, local area networks, metropolitan area networks, and so on;

a user interface module 318, which enables presentation of information (e.g., a graphical user interface for user application 324, widgets, websites and web pages thereof, audio content, and/or video content) at the vehicle 102 via one or more output devices 312 (e.g., displays or speakers);

an input processing module 320, which detects one or more user inputs or interactions from one of the one or more input devices 310 and interprets the detected input or interaction;

a web browser module 322, which navigates, requests (e.g., via HTTP), and displays websites and web pages thereof, including a web interface for logging into a user account of a user application 324;

one or more user applications 324, which are executed at the server 104. The user applications 324 include a vehicle user application that associates vehicles 102 with user accounts and facilitates controlling the vehicles 102, and enables users to edit and review settings and data associated with the vehicles 102;

a model training module 226, which trains a machine learning model 250, where the model 250 includes at least one neural network and is applied to process vehicle data (e.g., sensor data and vehicle control data) of one or more vehicles 102;

a data processing module 228, which manages:
- a multi-vehicle operation monitoring platform 332 configured to collect vehicle data 112 from a plurality of vehicles 102, monitor vehicle operation, detect faults, provide driving solutions, and update additional vehicle information 114 to individual vehicles 102 or client devices 108. The data processing module 228 manages vehicle data 112 for each individual vehicle 102 separately or processes vehicle data 112 of multiple vehicles 102 jointly (e.g., statistically, in the aggregate);
- a multi-installation operation monitoring platform 334 configured to collect infrastructure information 132 from a plurality of installations 130, monitor installation operation, detect faults (e.g., sensor 660 faults). In some embodiments, infrastructure information 132 for each individual installation 130 is managed separately. In some embodiments, infrastructure information 132 from multiple installations 130 are processed jointly (e.g., statistically, in the aggregate); and
- a scenario capturing system 700, as described with respect to FIG. 7. The scenario capturing system 700 is configured to monitor vehicle traffic data based on sensors 660 from a plurality of installations 130 and automatically capture event data. In some embodiments, the event data is used offline for training autonomous vehicles to improve their decision making capabilities. In some embodiments, the event data is used for developing road agent models and traffic models in large scale autonomous vehicle platforms;

one or more databases 340 for storing vehicle server data and infrastructure (e.g., installation) data, including:
- device settings 342, which include common device settings (e.g., service tier, device model, storage capacity, processing capabilities, communication capabilities, and/or medical procedure settings) of the server 104;
- user account information 344 for the one or more user applications 324 (e.g., user names, security questions, account history data, user preferences, and predefined account settings);
- network parameters 346 for the one or more communication networks 110, (e.g., IP address, subnet mask, default gateway, DNS server, and host name);
- training data 248 for training the machine learning model 250;
- machine learning models 250 for processing vehicle data;
- vehicle data 112, which is collected from a plurality of vehicles 102 and includes sensor data 254, mapping and location data 256, and vehicle control data 259;
- additional vehicle information 114, including vehicle operation information, fault information, and/or driving solution information, which are generated from the collected vehicle data 112;
- infrastructure information 132, including data collected by sensors 660 of the installations 130 and data processed by the installations 130 based on the data collected by the sensors 660 and the vehicle information 134;
- event recordings 350, which includes data of events recorded using sensors 660 of installations 130;
- event data 352, which includes data generated from the event recordings 350;
- historical traffic data 354, which includes collections of event data 352; and
- abstracted data 356, which comprises event data that has been converted to a different data format. In some embodiments, the abstracted data 356 comprises a processed bird's-eye view (BEV) data format. In some embodiments, the abstracted data 356 comprises vectorized data with timestamps.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 306 stores a subset of the modules and data structures identified above. In some embodiments, the memory 306 stores additional modules and data structures not described above.

Figure 4:
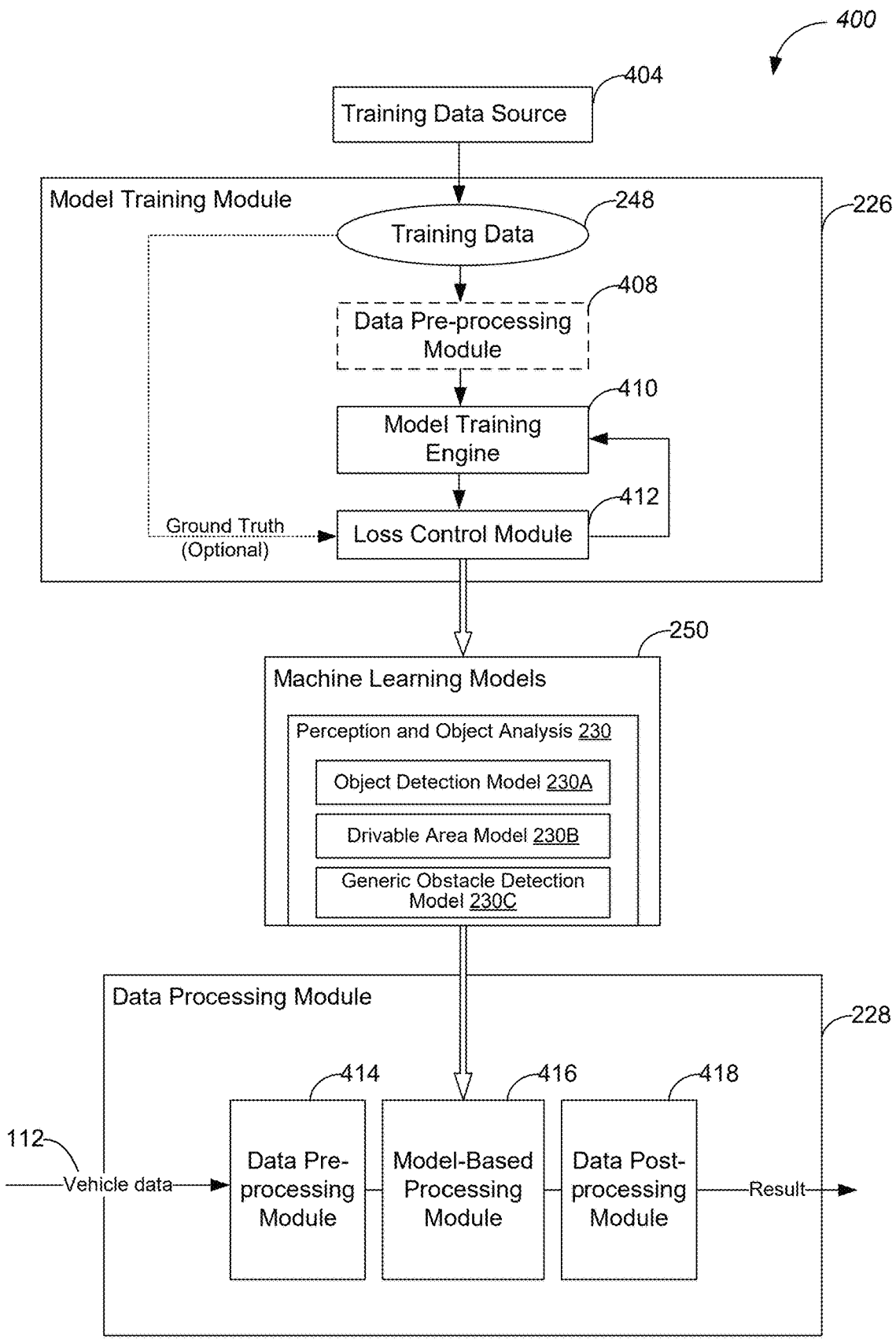
FIG. 4 is a block diagram of a machine learning system for training and applying vehicle data processing models for facilitating at least partial autonomous driving of a vehicle, in accordance with some embodiments.
Figure 5A:
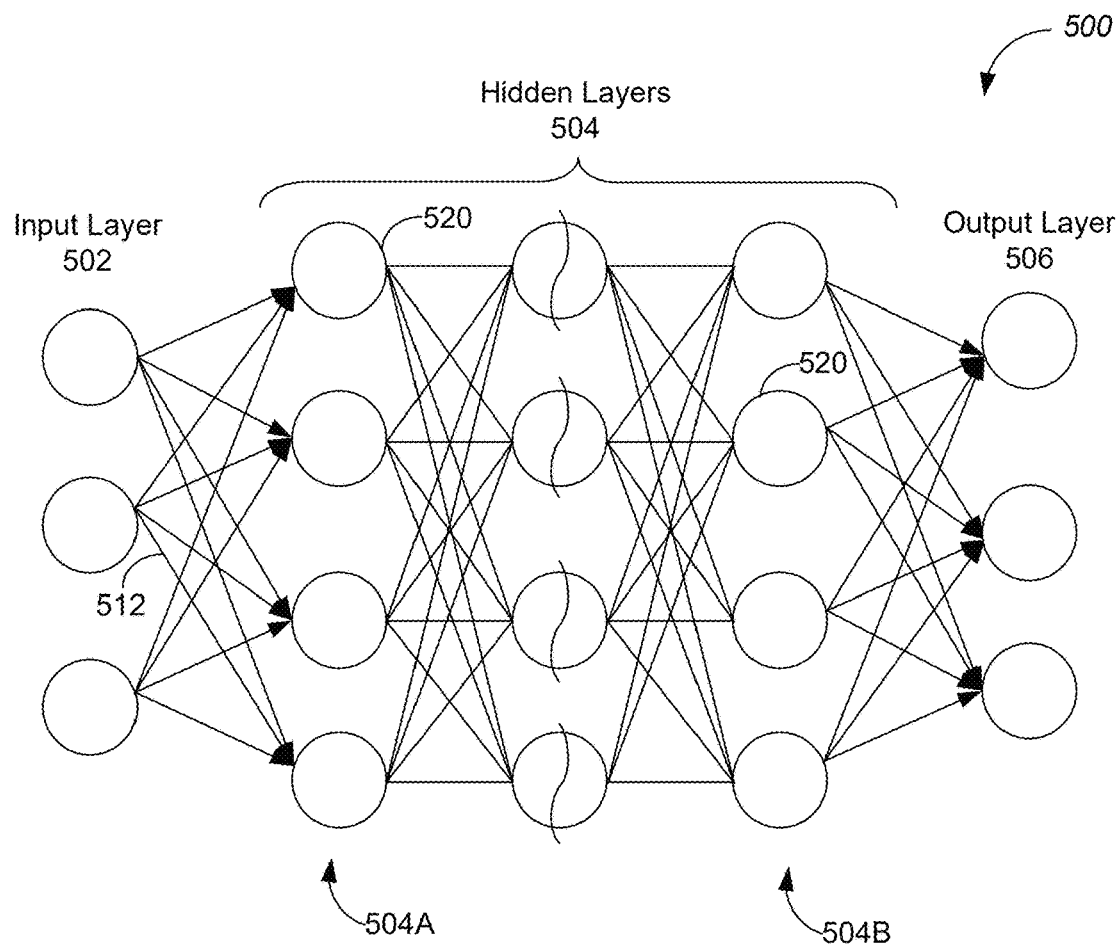
FIG. 5A is a structural diagram of an example neural network applied to process vehicle data in a vehicle data processing model, in accordance with some embodiments.
Figure 5B:
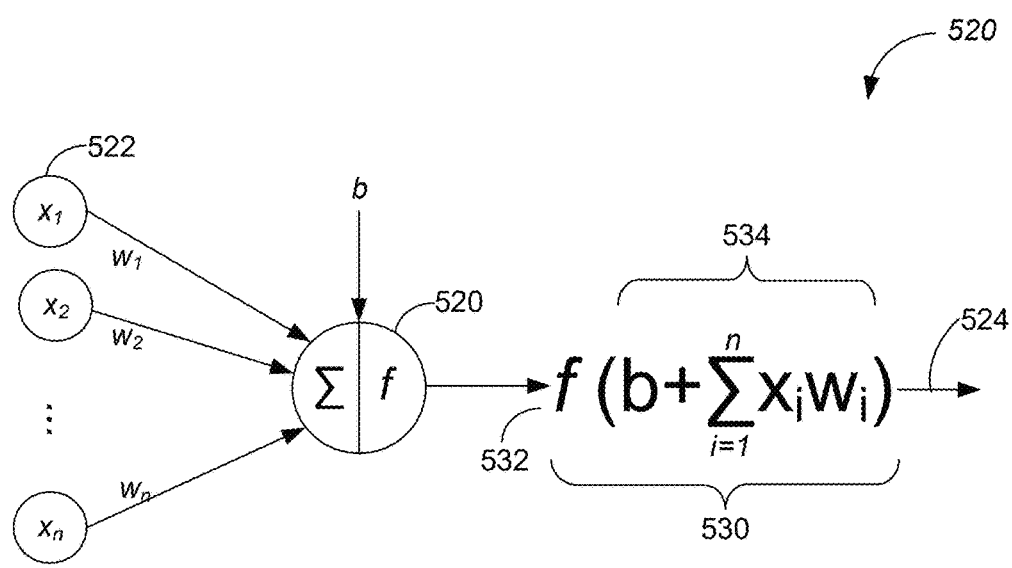
FIG. 5B is an example node in the neural network, in accordance with some embodiments.
Figure 6:
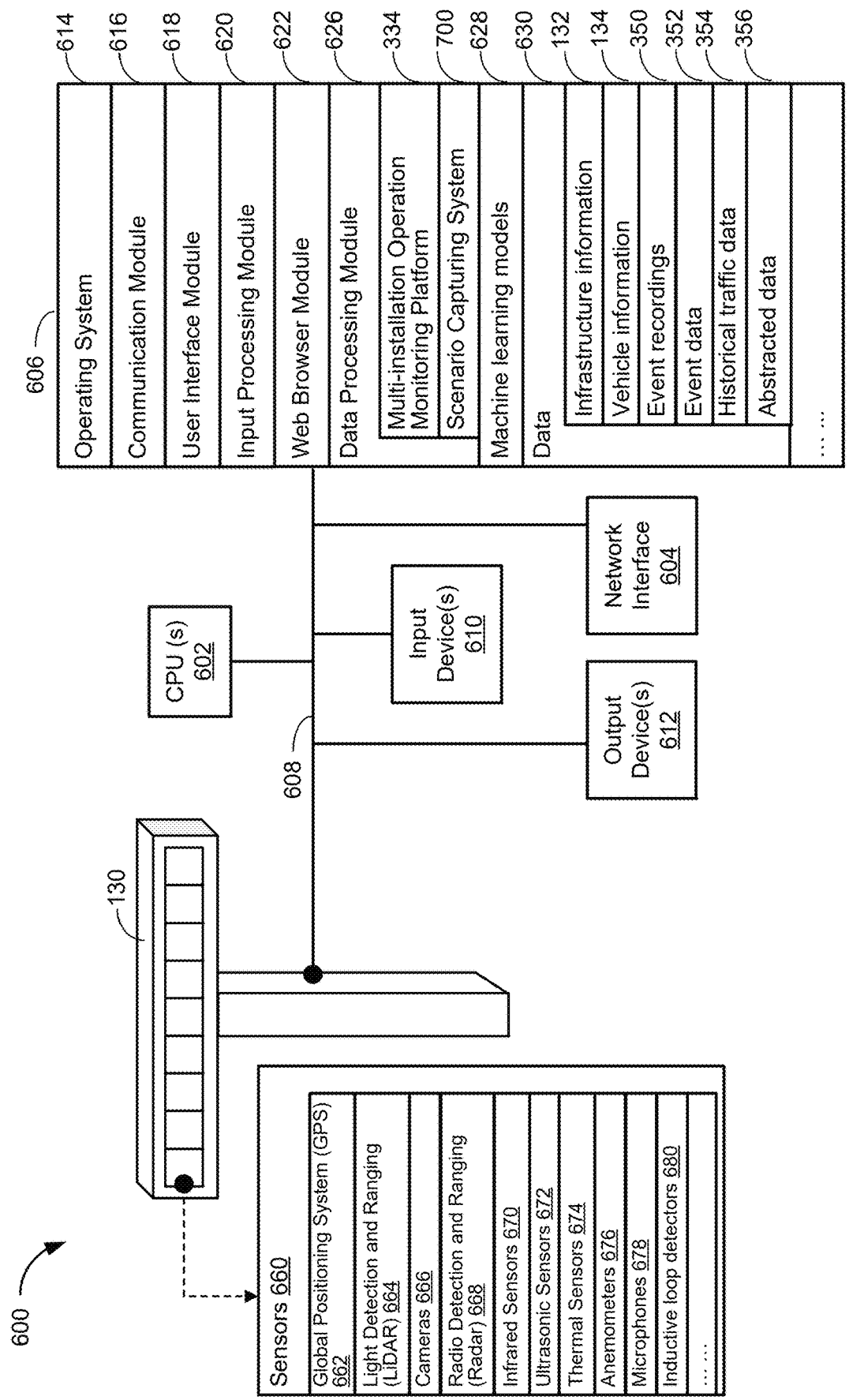
FIG. 6 is a block diagram of a computer system associated with an installation, in accordance with some embodiments.

FIGS. 4, 5A, and 5B provide background on the machine learning systems described herein, which are helpful in understanding the details of the embodiments described from FIG. 6 onward.

FIG. 4 is a block diagram of a machine learning system 400 for training and applying machine learning models 250 for facilitating driving of a vehicle, in accordance with some embodiments. The machine learning system 400 includes a model training module 226 establishing one or more machine learning models 250 and a data processing module 228 for processing vehicle data 112 using the machine learning model 250. In some embodiments, both the model training module 226 (e.g., the model training module 226 in FIG. 2) and the data processing module 228 are located within the vehicle 102, while a training data source 404 provides training data 248 to the vehicle 102. In some embodiments, the training data source 404 is the data obtained from the vehicle 102 itself, from a server 104, from storage 106, or from another vehicle or vehicles 102. Alternatively, in some embodiments, the model training module 226 (e.g., the model training module 226 in FIG. 3) is located at a server 104, and the data processing module 228 is located in a vehicle 102. The server 104 trains the data processing models 250 and provides the trained models 250 to the vehicle 102 to process real-time vehicle data 112 detected by the vehicle 102. In some embodiments, the training data 248 provided by the training data source 404 include a standard dataset (e.g., a set of road images) widely used by engineers in the autonomous vehicle industry to train machine learning models 250. In some embodiments, the training data 248 includes vehicle data 112 and/or additional vehicle information 114, which is collected from one or more vehicles 102 that will apply the machine learning models 250 or collected from distinct vehicles 102 that will not apply the machine learning models 250. The vehicle data 112 further includes one or more of sensor data 254, road mapping and location data 256, and control data 259. Further, in some embodiments, a subset of the training data 248 is modified to augment the training data 248. The subset of modified training data is used in place of or jointly with the subset of training data 248 to train the machine learning models 250.

In some embodiments, the model training module 226 includes a model training engine 410, and a loss control module 412. Each machine learning model 250 is trained by the model training engine 410 to process corresponding vehicle data 112 to implement a respective on-vehicle task. The on-vehicle tasks include, but are not limited to, perception and object analysis 230, vehicle localization and environment mapping 232, vehicle drive control 234, vehicle drive planning 236, local operation monitoring 238, and vehicle action and behavior prediction 240 (FIG. 2). Specifically, the model training engine 410 receives the training data 248 corresponding to a machine learning model 250 to be trained, and processes the training data to build the machine learning model 250. In some embodiments, during this process, the loss control module 412 monitors a loss function comparing the output associated with the respective training data item to a ground truth of the respective training data item. In these embodiments, the model training engine 410 modifies the machine learning models 250 to reduce the loss, until the loss function satisfies a loss criteria (e.g., a comparison result of the loss function is minimized or reduced below a loss threshold). The machine learning models 250 are thereby trained and provided to the data processing module 228 of a vehicle 102 to process real-time vehicle data 112 from the vehicle.

In some embodiments, the model training module 226 further includes a data pre-processing module 408 configured to pre-process the training data 248 before the training data 248 is used by the model training engine 410 to train a machine learning model 250. For example, an image pre-processing module 408 is configured to format road images in the training data 248 into a predefined image format. For example, the preprocessing module 408 may normalize the road images to a fixed size, resolution, or contrast level. In another example, an image pre-processing module 408 extracts a region of interest (ROI) corresponding to a drivable area in each road image or separates content of the drivable area into a distinct image.

In some embodiments, the model training module 226 uses supervised learning in which the training data 248 is labelled and includes a desired output for each training data item (also called the ground truth in some situations). In some embodiments, the desirable output is labelled manually by people or labelled automatically by the model training model 226 before training. In some embodiments, the model training module 226 uses unsupervised learning in which the training data 248 is not labelled. The model training module 226 is configured to identify previously undetected patterns in the training data 248 without pre-existing labels and with little or no human supervision. Additionally, in some embodiments, the model training module 226 uses partially supervised learning in which the training data is partially labelled.

In some embodiments, the data processing module 228 includes a data pre-processing module 414, a model-based processing module 416, and a data post-processing module 418. The data pre-processing modules 414 pre-processes vehicle data 112 based on the type of the vehicle data 112. In some embodiments, functions of the data pre-processing modules 414 are consistent with those of the pre-processing module 408, and convert the vehicle data 112 into a predefined data format that is suitable for the inputs of the model-based processing module 416. The model-based processing module 416 applies the trained machine learning model 250 provided by the model training module 226 to process the pre-processed vehicle data 112. In some embodiments, the model-based processing module 416 also monitors an error indicator to determine whether the vehicle data 112 has been properly processed in the machine learning model 250. In some embodiments, the processed vehicle data is further processed by the data post-processing module 418 to create a preferred format or to provide additional vehicle information 114 that can be derived from the processed vehicle data. The data processing module 228 uses the processed vehicle data to at least partially autonomously drive the vehicle 102 (e.g., at least partially autonomously). For example, the processed vehicle data includes vehicle control instructions that are used by the vehicle control system 290 to drive the vehicle 102.

In some embodiments, the data processing module 228 of the vehicle 102 (e.g., a first vehicle) is applied to perform perception and object analysis 230 by obtaining a road image including a road surface along which the first vehicle is travelling, identifying one or more identifiable objects on the road surface in the road image, and detecting a plurality of objects on the road surface in the road image. The data processing module 228 eliminates the one or more identifiable objects from the plurality of objects in the road image to determine one or more unidentifiable objects on the road surface in the road image. The first vehicle is at least partially autonomously driven by treating the one or more unidentifiable objects differently from the one or more identifiable objects. Further, in some embodiments, the machine learning models 250 of the vehicle 102 includes an object detection model 230A and a drivable area model 230B. The object detection model 230A is configured to identify the one or more identifiable objects in the road image and associate each identifiable object with a predefined object type or class. The drivable area model 230B is configured to determine a road surface in the road image. Additionally, in some embodiments, the machine learning models 250 includes a generic obstacle detection model 230C configured to detect a plurality of objects on the road surface in the road image, e.g., with or without determining a predefined object type or class of each of the plurality of objects. The generic obstacle detection model 230C is optionally modified from the drivable area model 230C by way of retraining.

FIG. 5A is a structural diagram of an example neural network 500 applied to process vehicle data in a machine learning model 250, in accordance with some embodiments, and FIG. 5B is an example node 520 in the neural network 500, in accordance with some embodiments. It should be noted that this description is used as an example only, and other types or configurations may be used to implement the embodiments described herein. The machine learning model 250 is established based on the neural network 500. A corresponding model-based processing module 416 applies the machine learning model 250 including the neural network 500 to process vehicle data 112 that has been converted to a predefined data format. The neural network 500 includes a collection of nodes 520 that are connected by links 512. Each node 520 receives one or more node inputs 522 and applies a propagation function 530 to generate a node output 524 from the one or more node inputs. As the node output 524 is provided via one or more links 512 to one or more other nodes 520, a weight w associated with each link 512 is applied to the node output 524. Likewise, the one or more node inputs 522 are combined based on corresponding weights $w_1$, $w_2$, $w_3$, and $w_4$ according to the propagation function 530. In an example, the propagation function 530 is computed by applying a non-linear activation function 532 to a linear weighted combination 534 of the one or more node inputs 522.

The collection of nodes 520 is organized into layers in the neural network 500. In general, the layers include an input layer 502 for receiving inputs, an output layer 506 for providing outputs, and one or more hidden layers 504 (e.g., layers 504A and 504B) between the input layer 502 and the output layer 506. A deep neural network has more than one hidden layer 504 between the input layer 502 and the output layer 506. In the neural network 500, each layer is only connected with its immediately preceding and/or immediately following layer. In some embodiments, a layer is a "fully connected" layer because each node in the layer is connected to every node in its immediately following layer. In some embodiments, a hidden layer 504 includes two or more nodes that are connected to the same node in its immediately following layer for down sampling or pooling the two or more nodes. In particular, max pooling uses a maximum value of the two or more nodes in the layer for generating the node of the immediately following layer.

In some embodiments, a convolutional neural network (CNN) is applied in a machine learning model 250 to process vehicle data (e.g., video and image data captured by cameras 266 of a vehicle 102). The CNN employs convolution operations and belongs to a class of deep neural networks. The hidden layers 504 of the CNN include convolutional layers. Each node in a convolutional layer receives inputs from a receptive area associated with a previous layer (e.g., nine nodes). Each convolution layer uses a kernel to combine pixels in a respective area to generate outputs. For example, the kernel may be to a 3×3 matrix including weights applied to combine the pixels in the respective area surrounding each pixel. Video or image data is pre-processed to a predefined video/image format corresponding to the inputs of the CNN. In some embodiments, the pre-processed video or image data is abstracted by the CNN layers to form a respective feature map. In this way, video and image data can be processed by the CNN for video and image recognition or object detection.

In some embodiments, a recurrent neural network (RNN) is applied in the machine learning model 250 to process vehicle data 112. Nodes in successive layers of the RNN follow a temporal sequence, such that the RNN exhibits a temporal dynamic behavior. In an example, each node 520 of the RNN has a time-varying real-valued activation. It is noted that in some embodiments, two or more types of vehicle data are processed by the data processing module 228, and two or more types of neural networks (e.g., both a CNN and an RNN) are applied in the same machine learning model 250 to process the vehicle data jointly.

The training process is a process for calibrating all of the weights $w_i$ for each layer of the neural network 500 using training data 248 that is provided in the input layer 502. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propagation, a margin of error of the output (e.g., a loss function) is measured (e.g., by a loss control module 412), and the weights are adjusted accordingly to decrease the error. The activation function 532 can be linear, rectified linear, sigmoidal, hyperbolic tangent, or other types. In some embodiments, a network bias term b is added to the sum of the weighted outputs 534 from the previous layer before the activation function 532 is applied. The network bias b provides a perturbation that helps the neural network 500 avoid over fitting the training data. In some embodiments, the result of the training includes a network bias parameter b for each layer.

FIG. 6 is a block diagram of a computer system 600 associated with an installation 130 for detecting conditions for vehicle driving in a vehicle driving environment (e.g., the environment 100 in FIG. 1), in accordance with some embodiments. The installation 130 includes a plurality of sensors 660. In some embodiments, the plurality of sensors 660 include one or more of a GPS 662, a LiDAR scanner 664, one or more cameras 666, a RADAR sensor 668, one or more infrared sensor 670, one or more ultrasonic sensors 672, one or more thermal sensors 674 (e.g., for measuring heat and/or temperature), one or more anemometers 676 for measuring wind speed and wind direction, and one or more microphones 678 for capturing audio in a vicinity of the installation 130. In some embodiments, the one or more microphones 678 are part of the cameras 666. In some embodiments, the one or more microphones 678 are separate from the cameras 666. In some embodiments, the plurality of sensors 660 include one or more inductive loop detectors 680 for transmitting and receiving communication signals, and/or detecting the presence or vehicles.

In some embodiments, the computer system 600 is physically co-located at the installation 130. For example, the computer system 600 comprises a microcontroller chip that is located locally at the installation 130, and at least a subset of the data collected at the installation 130 (e.g., using the sensors 660) is processed locally by the computer system 600. In some embodiments, the computer system 600 is at a physical location different from the installation 130. For example, the computer system 600 can comprise a cloud computer system that is communicatively connected to the installation 130. In some embodiments, the computer system includes one or more distinct systems located at distinct locations of a road or distinct systems located at different roads. Examples of the computer system 600 include, but are not limited to, a server computer, a desktop computer, a laptop computer, a tablet computer, or a mobile phone. The computer system 600 typically includes one or more processing units (CPUs) 602, one or more network interfaces 604, memory 606, and one or more communication buses 608 for interconnecting these components (sometimes called a chipset). The computer system 600 includes one or more user interface devices. The user interface devices include one or more input devices 610, which facilitate user input, such as a keyboard, a mouse, a voice-command input unit or microphone, a touch screen display, a touch-sensitive input pad, a gesture capturing camera, or other input buttons or controls. Furthermore, in some embodiments, the computer system 600 uses a microphone and voice recognition or a camera and gesture recognition to supplement or replace the keyboard. In some embodiments, the one or more input devices 610 include one or more cameras, scanners, or photo sensor units for capturing images, for example, of graphic serial codes printed on electronic devices. The computer system 600 also includes one or more output devices 610, which enable presentation of user interfaces and display content, including one or more speakers and/or one or more visual displays.

The memory 606 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 606 includes one or more storage devices remotely located from the one or more processing units 602. The memory 606, or alternatively the non-volatile memory within memory 606, includes a non-transitory computer readable storage medium. In some embodiments, the memory 606, or the non-transitory computer readable storage medium of the memory 606, stores the following programs, modules, and data structures, or a subset or superset thereof:

- an operating system 614, which includes procedures for handling various basic system services and for performing hardware dependent tasks;
- a communication module 616, which connects the computer system to other devices (e.g., vehicles 102, server 104, installations 130, and/or client devices 108) via one or more network interfaces (wired or wireless) and one or more communication networks 110, such as the Internet, other wide area networks, local area networks, metropolitan area networks, and so on. In some embodiments, the communications module 616 gathers information about road and weather conditions from vehicles 102 via a V2I or a V2X communication system that is installed on the vehicles 102. In some embodiments, the V2I or V2X communication system operate on a network that provides high speed, low latency communication;
- a user interface module 618, which enables presentation of information, widgets, websites and web pages thereof, audio content, and/or video content) via one or more output devices 612 (e.g., displays or speakers);
- an input processing module 620, which detects one or more user inputs or interactions from one of the one or more input devices 610 and interprets the detected input or interaction;
- a web browser module 622, which navigates, requests (e.g., via HTTP), and displays websites and web pages thereof;
- a data processing module 626, which:
  - manages a multi-installation operation monitoring platform 334 configured to collect infrastructure information 132 from a plurality of installations 130, monitor installation operation, detect faults (e.g., faults from sensors 660). In some embodiments, the data processing module 626 manages infrastructure information 132 for each individual installation 130 separately or processes infrastructure information 132 from multiple installations 130 jointly (e.g., statistically, in the aggregate); and
  - manages a scenario capturing system 700, which is described with reference to FIG. 7;
- one or more machine learning models 628. In some embodiments, the machine learning models 628 include at least one neural network and is applied to process vehicle traffic data collected by the sensors 660 and output a determination of whether the vehicle traffic data constitutes an event;
- data 630 that is stored locally on the computer system 600 or on one or more databases (e.g., database(s) 340), including:
  - infrastructure information 132. In some embodiments, infrastructure information 132 includes data collected by sensors 660 of installations 130. In some embodiments, infrastructure information 132 includes data that is processed by the installations 130 (e.g., via computer system 600) according to data collected by sensors 660 and/or vehicle information 134;
  - vehicle information 134. In some embodiments, vehicle information 134 includes information gathered by installations 130 from vehicles 102 via communication module 616. In some embodiments, vehicle information 134 includes information about vehicle dynamics (e.g., vehicle velocities and accelerations), vehicle data 112, and/or the additional vehicle information 114. In some embodiments, the vehicle information 134 includes include traffic, road, and/or weather information that are transmitted from the vehicles 102 to the installations 130;
  - event recordings 350, which includes data of events recorded using sensors 660 of installations 130;
  - event data 352, which includes data generated from the event recordings 350;
  - historical traffic data 354, which includes collections of event data 352; and
  - abstracted data 356, which comprises event data that has been converted to a different data format. In some embodiments, the abstracted data 356 comprises a processed bird's-eye view (BEV) data format. In some embodiments, the abstracted data 356 comprises vectorized data with timestamps.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 606 stores a subset of the modules and data structures identified above. In some embodiments, the memory 606 stores additional modules and data structures not described above. In some embodiments, a subset of the operations performed at the computer system 600 can also be performed at the server 104.

Figure 7:
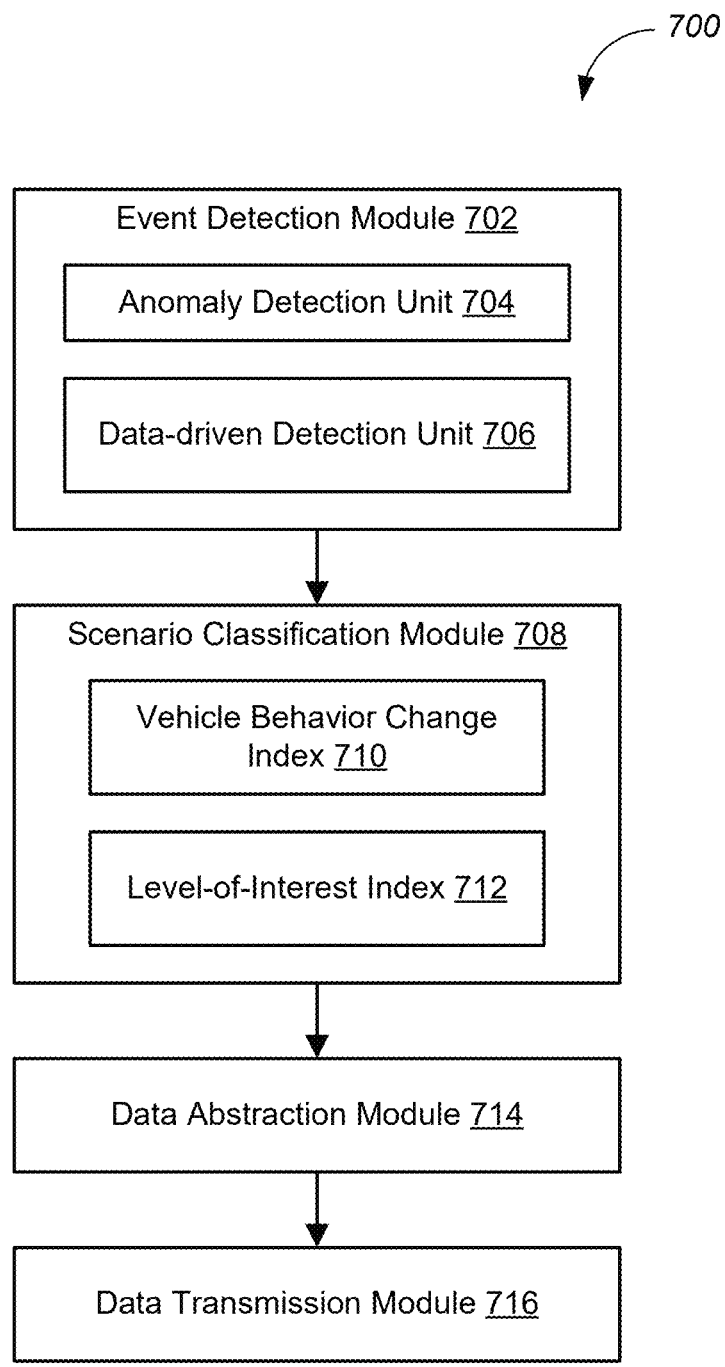
FIG. 7 illustrates a scenario capturing system, in accordance with some embodiments.

FIG. 7 illustrates a scenario capturing system 700, in accordance with some embodiments. In some embodiments, the scenario capturing system 700 enables continuous and low-cost generation of driving scenarios for training decision making algorithms on autonomous vehicles. In some embodiments, event data captured by the scenario capturing system 700 can be used for developing road agent models and traffic models in large scale autonomous vehicle driving platforms.

In some embodiments, the scenario capturing system 700 includes an event detection module 702, which is configured to monitor (e.g., continuously, periodically, or at regular intervals) vehicle traffic data using the plurality of sensors 660 that are mounted on installations 130. In some embodiments, the installations 130 are located in predefined zones of interest on a road, such as at a toll booth, an intersection, a freeway entrance or exit area, or a lane merge area.

In accordance with some embodiments of the present disclosure, the scenario capturing system 700 does not capture (e.g., record) all of the monitored vehicle traffic data due to the large amounts of information involved. Instead, the scenario capturing system 700 triggers recording of only a subset (i.e., less than all) of the monitored vehicle traffic data when the event detection module 702 determines that the monitored vehicle traffic data qualifies as an "event." As used herein, an event can be regarded as a situation that impacts the driving decision of an autonomous vehicle.

In some embodiments, the event detection module 702 includes an anomaly detection unit 704 that executes a rule-based algorithm to determine whether an event has occurred. For example, in some embodiments, the anomaly detection unit 704 is configured to determine that an event has occurred when the vehicle traffic data satisfies one or more criteria, which can include: (i) a determination that the vehicle traffic in the zone of interest has unusually high traffic density or unusually low traffic speed (e.g., beyond 2 or 3 standard deviations of an average traffic density of the zone of interest, or beyond 2 or 3 standard deviations of an average vehicle speed of the zone of interest), (ii) a determination that a cumulative duration of the honk/beep within a fixed time window from one or multiple vehicles exceeds a certain threshold (e.g., 10 second threshold within a 30-second window), or (iii) a determination that the vehicle traffic is occurring at a predetermined time of the day or week, or particular season(s) in a year. In some embodiments, the event detection module 702 is configured to determine whether an event has occurred by comparing the vehicle traffic data against a set of predefined rules to determine whether the vehicle traffic data satisfies a rule of the set of predefined rules. The predefined rules can be based on the type(s) of vehicles that travel in the zone of interest of the road, or numbers of road users involved, or whether a collision is involved, or a severity of the collision.

In some embodiments, the event detection module 702 includes data-driven detection unit 706 that implements a data-driven approach (e.g., non-rule based approach, an AI/ML approach) to determine whether an event has occurred. For example, the data-driven detection unit 706 may be configured to obtain the vehicle traffic data from the sensors 660, and input at least a subset of the vehicle traffic data into a deep neural network (e.g., machine learning models 628) that is configured to determine whether the vehicle traffic data satisfies one or more criteria for occurrence of the first event. In some embodiments, the neural network is trained to formulate/determine a "normal" traffic pattern for the location of the fixed installation by monitoring (e.g., continuously) the traffic data combined with other information such as the weather condition, a speed limit of a respective road, and whether or not extended roadwork(s) are present. In some circumstances, the "normal" traffic pattern can also depend on the time of a day, the day(s) of a week, or season(s) of a year. In some embodiments, the machine learning models 628 can be trained by labeled data generated from the rule-based approaches described with respect to the anomaly detection unit 704 above.

In some embodiments, the event detection module 702 is configured to automatically trigger recording of an event, via the plurality of sensors 660, when the anomaly detection unit 704 or the data-driven detection unit 706 determines that an event has occurred. In some embodiments, when an event recording is triggered, the scenario capturing system 700 (e.g., via the sensors 660) records a set of signals related to traffic, weather, and road conditions for at least a pre-defined duration (e.g., 30 seconds).

In some embodiments, the event detection module 702 temporarily stores road condition monitoring data in a rolling buffer with a pre-defined rolling buffer period (e.g., most recent 30 seconds, 60 seconds, or 90 seconds). When the recording of the event is triggered, the event detection module 702 adds at least a portion of the temporarily stored road condition monitoring data to the event recording.

In some embodiments, the scenario capturing system 700 generates event data (e.g., event data 352) based on recordings of one or more events (e.g., event recordings 350) and adds the event data to a corpus of data to generate historical traffic data (e.g., historical traffic data 354). In some embodiments, the event data (e.g., the historical traffic data) is used as training data to improve autonomous vehicle decision making modules.

In some embodiments, the scenario capturing system 700 retains all the event recordings and generates event data based on all the event recordings. In some embodiments, the scenario capturing system 700 retains only a subset (i.e., less than all) of the event recordings by performing classification on the recorded events to identify scenarios (e.g., according to a complexity of an event).

As depicted in FIG. 7, in some embodiments, the scenario capturing system 700 includes a scenario classification module 708 that is configured to classify the recorded events and determine a level of complexity of the events. In some embodiments, the scenario classification module 708 is configured to apply a vehicle behavior change index 710 to quantify event (e.g., scenario) complexity. For example, the vehicle behavior change index 710 can include a predetermined set of values (e.g., values "1", "2", and "3"). When a respective event involves a first vehicle, the scenario classification module 708 can select, from the predetermined set of values, a value corresponding to the behavior of the first vehicle in the respective event. For example, the scenario classification module 708 may assign the first vehicle in the respective event a value of "1" if the first vehicle changes its travel mode from cruising to hard braking, a value of "2" if it suddenly applies a braking action, or a value of "3" for the first index if it unexpectedly changes its lane at the same time that it suddenly applies its brakes. In some embodiments, the scenario classification module 708 is configured to quantify event (e.g., scenario) complexity according to a level-of-interest index 712. Referring to the same example of the respective event involving the first vehicle, if the respective event also involves one or more other vehicles, the scenario classification module 708 can determine a respective value for each of these other vehicles using the vehicle behavior change index 710 and aggregate the values for the first vehicle and each of these other vehicles to derive an aggregated value corresponding to the level-of-interest index 712 (e.g., if the respective event involves just the first vehicle, the aggregate value corresponding to the level-of-interest index is the same as the value for the vehicle behavior change index for the first vehicle).

In some embodiments, the scenario classification module 708 may compare the aggregated value against a threshold value. When the aggregated value satisfies (e.g., meets or exceeds) the threshold value, the scenario classification module 708 is configured to retain the recording and generate event data based on the recording. In some embodiments, the threshold value can be predefined according to a location of the fixed installation 130 (e.g., different locations can be assigned different threshold values). For example, a threshold value for recordings from toll booths may be lower than another threshold value for recordings from traffic junctions if toll booths are deemed to be of higher interest than traffic junctions, so as to ensure that the recordings from toll booths have a higher probability of being retained.

In some embodiments, the scenario classification module 708 is configured to classify the recorded events and determine a level of complexity of the events according to the type(s) of vehicles involved, a number of road users involved, whether the event involves a collision between a vehicle and a human subject or between vehicles, or whether safety features such as the anti-lock braking system (ABS), electronic safety control (ESC), or Automatic emergency braking (AEB) features were triggered. For example, in some embodiments, the vehicles can communicate with the scenario capturing system 700 via the V2I communication system when safety features were triggered. In some embodiments, these details can be labeled (e.g., as tags) as event metadata to facilitate querying of the event data.

In some embodiments, the scenario classification module 708 is configured to classify the recorded events and determine a level of complexity of the events according to an event type, or a location where an event occurred. For example, the scenario classification module 708 can gather event recordings from various toll booths, aggregate all the toll booth event recordings, and transmit the data (e.g., via data transmission module 716) to a backend server to facilitate the generation of a toll booth algorithm that enables autonomous vehicles navigate toll booths. A similar analogy applies to other event types/recordings, such as recordings from different freeway ramps, freeway exits, or traffic junctions.

In some embodiments, the scenario classification module 708 is configured to combine the recorded events classification and the determined level of complexity information with other information such as the location of the installations 130 (e.g., whether it is at a toll booth, an intersection, etc.) to provide more detailed classification of the events.

In some embodiments, the scenario capturing system 700 includes a data abstraction module 714 that is configured to reduce a data size of the event data and/or abstract information of users that may be involved in the events (e.g., because of privacy concern). For example, in some embodiments, the event data that is retained by the scenario classification module 708 may be encoded (e.g., as abstracted data 356) in a way such that all vehicles are masked with new identifiers and only essential signals for reproducing the events are preserved. In some embodiments, the abstracted data 356 comprises a processed bird's-eye view (BEV) data format. In some embodiments, the abstracted data 356 comprises vectorized data with timestamps. In some embodiments, the event data (i.e., data prior to abstraction) is also stored locally and may be transferred to authorized institutions at a subsequent time.

In some embodiments, the scenario capturing system 700 includes a data transmission module 716 that is configured to transmit the abstracted area and the event data. In some embodiments, when a first event involves a first vehicle, the data transmission module 716 is configured to receive data corresponding to the first event. In some embodiments, the data transmission module 716 is configured to transmit the event data and/or the abstracted data to a backend server for storage and/or further processing.

Figure 8B:
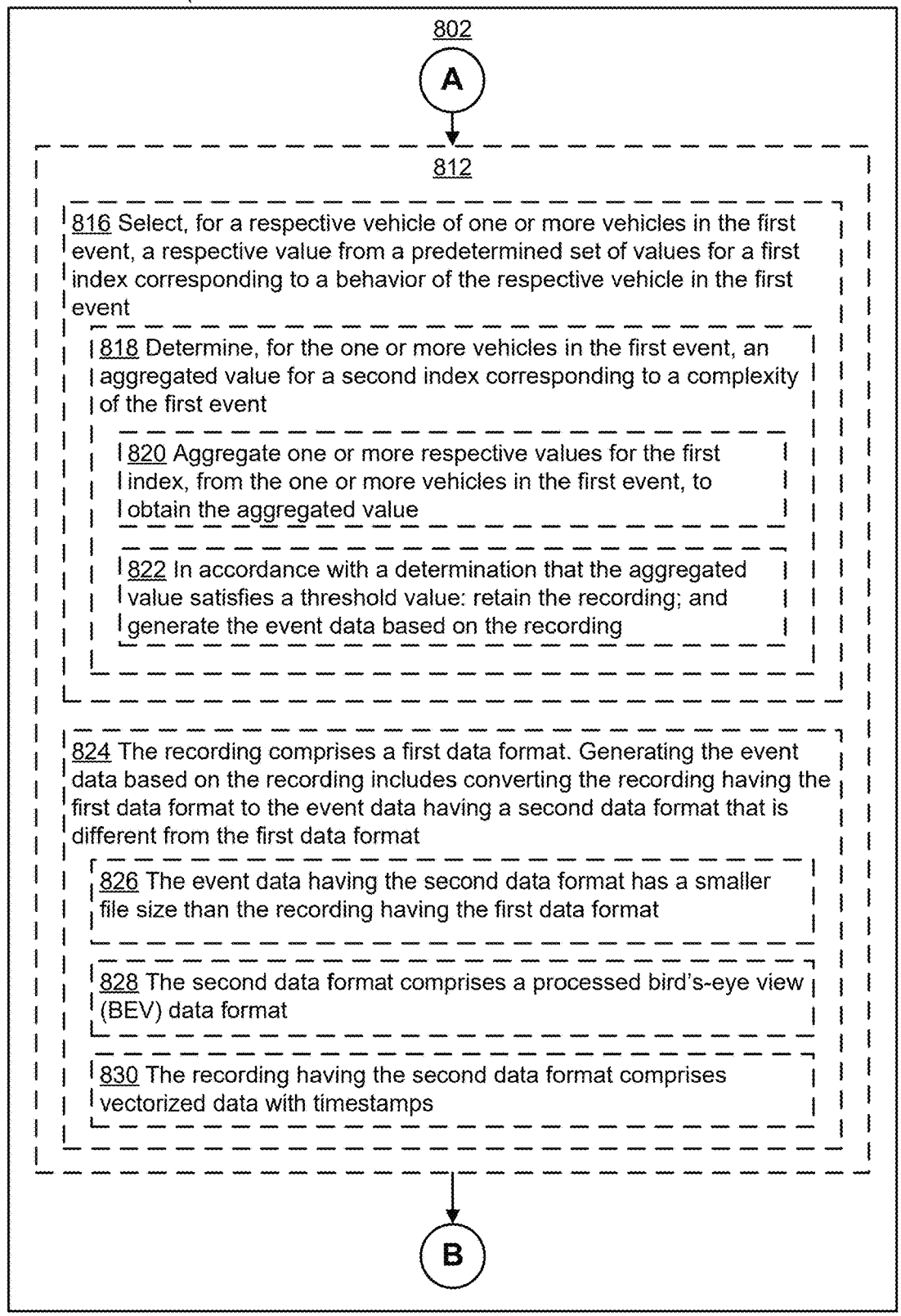
Figure 8C:
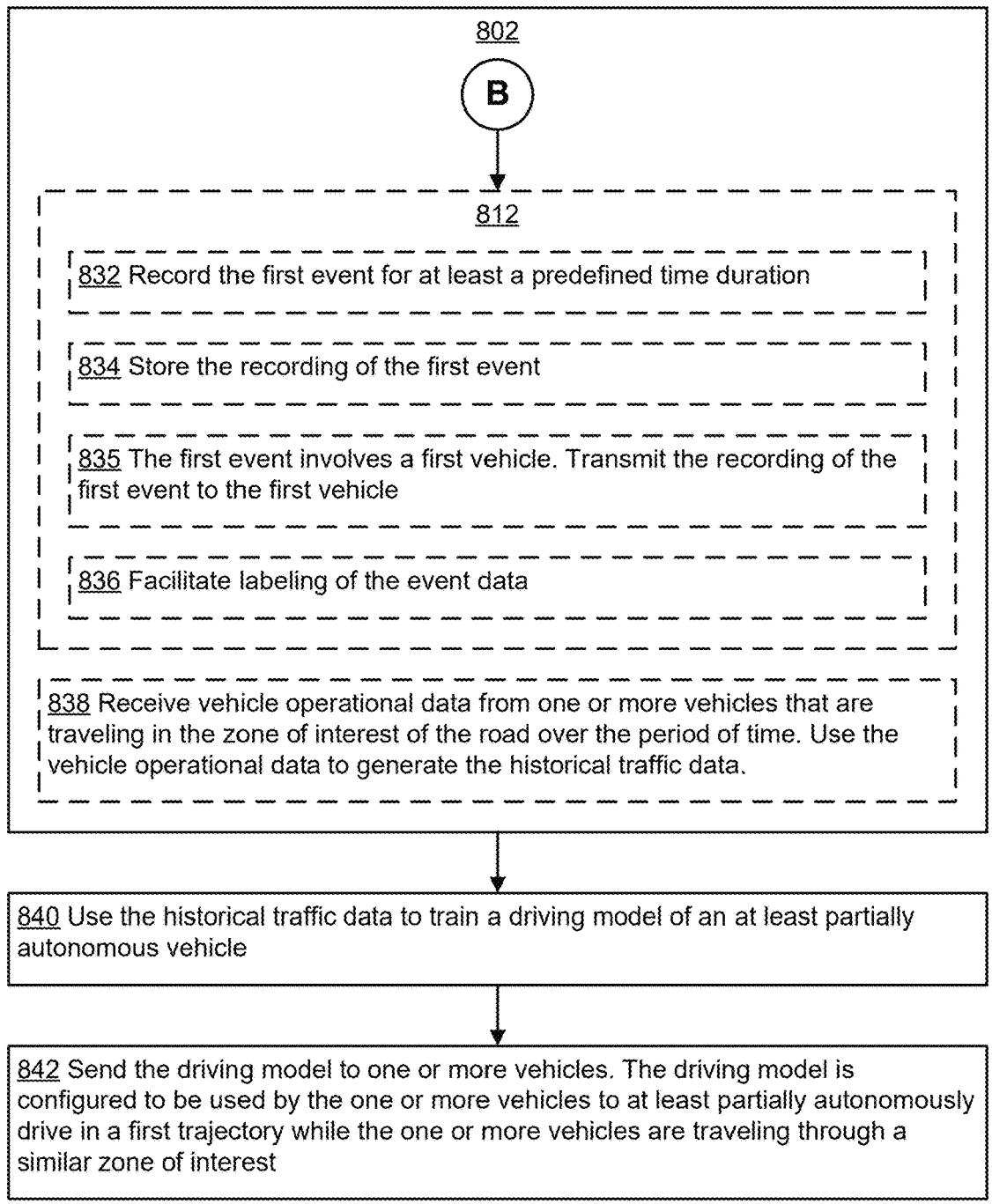

FIGS. 8A to 8C provide a flowchart of an example process for automatic event capturing, in accordance with some embodiments. The method 800 is performed at a computer system (e.g., computer system 600) that includes a plurality of sensors (e.g., sensors 660) positioned on a fixed installation (e.g., installation 130) at a road. In some embodiments, the plurality of sensors includes one or more cameras (e.g., cameras 666) and one or more microphones (e.g., microphones 678). The microphones 678 may be part of the cameras or separate from the cameras.

In some embodiments, the computer system is physically co-located at the fixed installation and the processing is performed locally at the fixed installation. In some embodiments, the computer system is located remotely from and communicatively coupled to the fixed installation. In some embodiments, the computer system includes one or more (e.g., at least one or at least two) distinct systems located at distinct locations of the road. In one example, there may be multiple systems along the same road, each system including an installation having its own respective sensors 660 and/or processing capabilities. In another example, multiple systems may be located at different roads. For instance, a first system may be located at a on-ramp segment of a freeway and a second system may be located at a road junction; or a first system may be located at a toll booth in a first city and a second system may be located at another toll booth in a second city.

The computer system includes one or more processors (e.g., CPU(s) 602) and memory (e.g., memory 606). In some embodiments, the memory stores one or more programs or instructions configured for execution by the one or more processors. In some embodiments, the operations shown in FIGS. 1, 2, 4, 5A, 5B, 6, and 7 correspond to instructions stored in the memory or other non-transitory computer-readable storage medium. The computer-readable storage medium may include a magnetic or optical disk storage device, solid state storage devices such as Flash memory, or other non-volatile memory device or devices. In some embodiments, the instructions stored on the computer-readable storage medium include one or more of: source code, assembly language code, object code, or other instruction format that is interpreted by one or more processors. Some operations in the method 800 may be combined and/or the order of some operations may be changed.

The computer system monitors (802) (e.g., continuously, periodically, or at regular intervals), using at least the plurality of sensors (e.g., sensors 660) on the fixed installation (e.g., installation 130), vehicle traffic data in a zone of interest of the road over a period of time to generate historical traffic data (e.g., historical traffic data 354). In some embodiments, a zone of interest of the road can include any segment of a road, an on-ramp region of a highway, a lane merge area of a highway, a road intersection, a toll booth, or a junction where two or more roads meet.

In some embodiments, the computer system determines (804) (e.g., using event detection module 702, based on the vehicle traffic data in a zone of interest of the road), whether a first event has occurred. As used herein, in some embodiments, an "event" can be regarded as a situation that impacts the driving decision of an autonomous vehicle.

In some embodiments, the determination that the first event has occurred comprises rule-based determination (e.g., determined via anomaly detection unit 704). For example, in some embodiments, the computer system determines that the first event has occurred when the vehicle traffic data satisfies (806) a first set of (e.g., one or more) criteria. In one example, the determination that the vehicle traffic satisfies the first set of criteria includes a determination that the vehicle traffic in the zone of interest has unusually high traffic density or unusually low traffic speed (e.g., beyond 2-3 standard deviations of an average traffic density of the zone of interest, or beyond 2-3 standard deviations of an average vehicle speed of the zone of interest. In another example, the determination that the vehicle traffic satisfies the first set of criteria includes a determination that a cumulative duration of the honk/beep within a fixed time window from one or more vehicles in the zone of interest of the road exceeds a certain threshold (e.g., 10 second threshold within a 30-sec window). In yet another example, the determination that the vehicle traffic satisfies the first set of criteria includes a determination that the vehicle traffic is occurring at a predetermined time of the day, or at a predefined time of the week, or at a particular season of the year. In some embodiments, a recording of the first event is triggered (e.g., automatically, without user intervention) when the threshold is satisfied or exceeded.

In some embodiments, the determination that first event has occurred includes comparing (808) (e.g., using anomaly detection unit 704) the vehicle traffic data against a set of predefined rules to determine whether the vehicle traffic data satisfies a rule of the set of (e.g., one or more) predefined rules. For example, the set of predefined rules can be based on the type(s) of vehicles that travel on the road, or the number of road users or vehicles involved, whether an accident (e.g., a collision) is involved, or the severity of the accident.

In some embodiments, the determination that the first event has occurred comprises data-driven determination (e.g., determined using data-driven detection unit 706). For example, in some embodiments, the computer system inputs (810) the vehicle traffic data into a deep neural network (e.g., machine learning models 628) that is configured to determine whether the vehicle traffic data satisfies one or more criteria for occurrence of the first event. In some embodiments, the neural network is trained to formulate/determine a "normal" traffic pattern for the location of the fixed installation by monitoring (e.g., continuously) the traffic data combined with other information such as weather condition and/or whether extended roadwork(s) are present. The "normal" traffic pattern can also be dependent on time of the day, day of the week, and season of the year. In some embodiments, the machine learning models 628 can be trained by labeled data generated from the rule-based approaches as described above (e.g., whether the vehicle traffic in the zone of interest has unusually high traffic density or unusually low traffic speed (e.g., beyond 2-3 standard deviations of an average traffic density of the zone of interest, or beyond 2-3 standard deviations of an average vehicle speed of the zone of interest.), or whether a cumulative duration of the honk/beep within a fixed time window from one or multiple vehicles exceeds a certain threshold (e.g., 10 second threshold within a 30-second window).

In some embodiments, in accordance with a determination that the first event has occurred, the computer system triggers (812) (e.g., automatically, without user intervention) recording of the first event via the plurality of sensors (e.g., sensors 66) (e.g., to obtain event recordings 350), generates event data (e.g., event data 352) based on the recording, and adds the event data to a corpus of data to generate the historical traffic data (e.g., historical traffic data 354). In some embodiments, the triggering recording of the first event via the plurality of sensors occurs automatically and without user input.

In some embodiments, the computer system temporarily stores (814) road condition monitoring data corresponding to a pre-defined buffer period such as the most recent 30 seconds, 60 seconds, or 90 seconds (e.g., as a rolling buffer). Triggering recording of the first event includes adding at least a portion of the temporarily stored road condition monitoring data to the first event recording.

Referring to FIG. 8B, in some embodiments, generating the event data based on the recording includes selecting (816) (e.g., via scenario classification module 708), for a respective vehicle of one or more vehicles in the first event, a respective value from a predetermined set of values for a first index (e.g., vehicle behavior change index 710) corresponding to a behavior of the respective vehicle in the first event. For example, in some embodiments, the predetermined set of values for the first index corresponding to the behavior of the respective vehicle in the first event comprises the values "1", "2", and "3". The computer system may assign a value to a vehicle based on a list of vehicle behavior changes, depending on how drastic the behavior change of the vehicle is. A respective vehicle may be assigned a value of "1" for the first index if it changes from cruising to hard braking. The respective vehicle may be assigned a value of "2" for the first index if it suddenly applies a braking action. The respective vehicle may be assigned a value of "3" for the first index if the vehicle unexpectedly changes its lane ta the same time that it suddenly applies a braking action.

In some embodiments, generating the event data based on the recording includes determining (818) (e.g., via scenario classification module 708), for the one or more vehicles in the first event, an aggregated value for a second index corresponding to a complexity of the first event. For example, the second index can be a level-of-interest index 712 that quantifies how complicated a scenario is (e.g., the more complex the scenario, the higher the level-of-interest index).

In some embodiments, the computer system aggregates (820) one or more respective values for the first index, from the one or more vehicles in the first event, to obtain the aggregated value.

In some embodiments, in accordance with a determination (e.g., by the computer system, via scenario classification module 708) that the aggregated value satisfies a threshold value (e.g., the aggregated value is equal to, or exceeds, the threshold value), the computer system retains (822) the recording and generates the event data based on the recording. For example, in some embodiments, the threshold value can be designated according to a location of the fixed installation. As an example, a fixed installation that is located at a toll booth, a road junction/intersection, or at a merge zone may be of higher interest than another fixed installation that is located on a regular segment of a freeway. In some instances, a fixed installation that is located at a section of a road that is of higher interest may be designated a lower threshold value, to ensure that recordings from the higher interest locations have a higher probability of being retained.

In some embodiments, the recording comprises (824) a first data format. Generating the event data based on the recording includes converting the recording having the first data format to the event data having a second data format (e.g., abstracted data 356) that is different from the first data format. For example, the event data having the second data format can be of a different protocol or different data structure from the first data format, ensuring its correct interpretation upon receipt.

In some embodiments, generating the event data based on the recording includes compressing the recording having the first data format to the event data having the second data format the event data, such that the second data format has (826) a smaller file size than the recording having the first data format. For example, to reduce the data size to be transmitted and preserve the privacy of the road users, the computer system can encode the event data in a way that all vehicles in the first event are masked with new IDs and only essential signals for reproducing the event are preserved.

In some embodiments, the second data format comprises (828) a processed bird's-eye view (BEV) data format. In some instances, the BEV data format provides a convenient way to view the "larger picture" of the recording.

In some embodiments, the recording having the second data format comprises (830) vectorized data with timestamps.

With continued reference to FIG. 8C, in some embodiments, the computer system records (832) the first event for at least a predefined time duration (e.g., 20 seconds, 30 seconds, or one minute).

In some embodiments, the computer system stores (834) the recording of the first event. For example, in some embodiments, the recording of the first event is raw data of the first event. In some embodiments, the recording is stored locally on the computer system, or remotely on a database that is communicatively connected with the computer system. In some instances, the recording of the first event can be transferred to authorized institutions. For example, if the recording of the first event captures a traffic accident, a portion of the recording may be transmitted to authorized institutions such as a Highway Patrol unit.

In some embodiments, the first event involves (835) a first vehicle. The method includes transmitting (e.g., via data transmission module 716) the recording of the first event to the first vehicle. For example, the transmitting can be in response to receiving a request from the first vehicle to receive the event data.

In some embodiments, the computer system facilitates (836) (e.g., enables or causes) labeling of the event data. For example, a human, the computer system, or another computing device can add tags to an event for easier querying. The tags can include a location at which the data is recorded (e.g., toll booth, intersection region, merger zone), whether collision is involved, and whether vehicle safety features such as an anti-lock braking system (ABS), an automatic emergency braking (AEB) system, or lean electronic stability control (ESC) system were triggered.

In some embodiments, the computer system receives (838) vehicle operational data from one or more vehicles (e.g., via a wireless communication network such as a 5G network, or via a V2I or V2X communication system of the one or more vehicles) that are traveling in the zone of interest of the road over the period of time. The computer system uses the vehicle operational data to generate the historical traffic data (e.g., historical traffic data 354). For example, in some embodiments, the vehicle traffic data includes vehicle operational data/conditions of one or more vehicles traveling in the zone of interest, such as whether safety features such as the anti-lock braking system (ABS), electronic safety control (ESC), or Automatic emergency braking (AEB) features, were triggered.

The computer system uses (840) the historical traffic data to train (e.g., at least partially train) a driving model of an at least partially autonomous vehicle. In some embodiments, the training is performed offline (e.g., not real time), asynchronously with the recording or scenario classification. In some embodiments, the training is performed in real time, synchronously with the recording or scenario classification.

The computer system sends (842) the driving model to one or more vehicles. The driving model is configured to be used by the one or more vehicles to at least partially autonomously drive in a first trajectory while the one or more vehicles are traveling through a similar zone of interest.

Turning on to some example embodiments:

(A1) In accordance with some embodiments, a method for automatic event capturing is performed at a computer system that includes a plurality of sensors that are positioned on a fixed installation at a road, one or more processors, and memory. The method includes: (i) monitoring, by the plurality of sensors on the fixed installation, vehicle traffic data in a zone of interest of the road over a period of time to generate historical traffic data; (ii) using the historical traffic data to train a driving model of an at least partially autonomous vehicle; and (iii) sending the driving model to one or more vehicles, where the driving model is configured to be used by the one or more vehicles to at least partially autonomously drive in a first trajectory while the one or more vehicles are traveling through a similar zone of interest.

(A2) In some embodiments of A1, the computer system includes one or more distinct systems located at distinct locations of the road.

(A3) In some embodiments of A1 or A2, monitoring the vehicle traffic data in the zone of interest of the road includes, in accordance with a determination that a first event has occurred: (i) triggering recording of the first event via the plurality of sensors; (ii) generating event data based on the recording; and (iii) adding the event data to a corpus of data to generate the historical traffic data.

(A4) In some embodiments of A3, the method further includes temporarily storing road condition monitoring data corresponding to a pre-defined buffer period. Triggering recording of the first event includes adding at least a portion of the temporarily stored road condition monitoring data to the first event recording.

(A5) In some embodiments of A3 or A4, determining that the first event has occurred includes determining that the vehicle traffic data satisfies a first set of criteria.

(A6) In some embodiments of any of A3-A5, the determination that first event has occurred includes comparing the vehicle traffic data against a set of predefined rules to determine whether the vehicle traffic data satisfies a rule of the set of predefined rules.

(A7) In some embodiments of any of A3-A6, the determination that that first event has occurred includes inputting the vehicle traffic data into a deep neural network that is configured to determine whether the vehicle traffic data satisfies one or more criteria for occurrence of the first event.

(A8) In some embodiments of any of A3-A7, generating the event data based on the recording includes selecting, for a respective vehicle of one or more vehicles in the first event, a respective value from a predetermined set of values for a first index corresponding to a behavior of the respective vehicle in the first event.

(A9) In some embodiments of A8, generating the event data based on the recording includes determining, for the one or more vehicles in the first event, an aggregated value for a second index corresponding to a complexity of the first event.

(A10) In some embodiments of A9, determining the aggregated value includes aggregating one or more respective values for the first index, from the one or more vehicles in the first event, to obtain the aggregated value.

(A11) In some embodiments of A9 or A10, the method further includes. in accordance with a determination that the aggregated value satisfies a threshold value: (i) retaining the recording; and (ii) generating the event data based on the recording.

(A12) In some embodiments of any of A3-A11, the recording comprises a first data format. Generating the event data based on the recording includes converting the recording having the first data format to the event data having a second data format that is different from the first data format.

(A13) In some embodiments of A12, the event data having the second data format has a smaller file size than the recording having the first data format.

(A14) In some embodiments of A12 or A13, the second data format comprises a processed bird's-eye view (BEV) data format.

(A15) In some embodiments of any of A12-A14, the recording having the second data format comprises vectorized data with timestamps.

(A16) In some embodiments of any of A3-A15, the method further includes recording the first event for at least a predefined time duration.

(A17) In some embodiments of any of A3-A16, the method further includes storing the recording of the first event.

(A18) In some embodiments of any of A3-A17, the first event involves a first vehicle. The method further includes transmitting the recording of the first event to the first vehicle.

(A19) In some embodiments of any of A3-A18, the method further includes facilitating labeling of the event data.

(A20) In some embodiments of any of A1-A19, the method further includes: receiving vehicle operational data from one or more vehicles that are traveling in the zone of interest of the road over the period of time; and using the vehicle operational data to generate the historical traffic data.

(A21) In some embodiments of any of A1-A20, the plurality of sensors include: one or more cameras; and one or more microphones.

(B1) In accordance with some embodiments, a computer system is associated with a fixed installation having a plurality of sensors. The computer system comprises one or more processors and memory coupled to the one or more processors. The memory stores instructions that, when executed by the one or more processors, cause the computer system to perform the method of any of A1-A21.

(C1) In accordance with some embodiments, a non-transitory computer-readable storage medium stores instructions that, when executed by one or more processors of computer system that is associated with a fixed installation having a plurality of sensors, cause the computer system to perform the method of any of A1-A21.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, the phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or implementations.

As used herein, the term "and/or" encompasses any combination of listed elements. For example, "A, B, and/or C" includes the following sets of elements: A only, B only, C only, A and B without C, A and C without B, B and C without A, and a combination of all three elements, A, B, and C.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for automatic event capturing, comprising:
    at a computer system that includes a plurality of sensors that are positioned on a fixed installation at a road, one or more processors, and memory:
        monitoring, by the plurality of sensors on the fixed installation, vehicle traffic data in a zone of interest of the road over a period of time to generate historical traffic data, wherein the zone of interest is of a first type;
        using the historical traffic data to train a driving model of an at least partially autonomous vehicle; and
        sending the driving model to one or more vehicles, wherein the driving model is configured to be used by the one or more vehicles to at least partially autonomously drive along a first trajectory while the one or more vehicles are traveling through a zone of the first type and wherein the driving model supplements an existing vehicle control system that is controlling the one or more vehicles and is only used while the one or more vehicles are traveling through the zone of the first type.

2. The method of claim 1, wherein monitoring the vehicle traffic data in the zone of interest of the road includes:
    in accordance with a determination that a first event has occurred:
        triggering a recording of the first event via the plurality of sensors; and
        generating event data based on the recording; and
        adding the event data to a corpus of data to generate the historical traffic data.

3. The method of claim 2, further comprising:
    temporarily storing road condition monitoring data corresponding to a pre-defined buffer period; and wherein triggering the recording of the first event includes adding at least a portion of the temporarily stored road condition monitoring data to the recording of the first event.

4. The method of claim 2, wherein determining that the first event has occurred includes determining that the vehicle traffic data satisfies a first set of criteria.

5. The method of claim 2, wherein the determination that first event has occurred includes:
comparing the vehicle traffic data against a set of predefined rules to determine whether the vehicle traffic data satisfies a rule of the set of predefined rules.

6. The method of claim 2, wherein the determination that the first event has occurred includes:
inputting the vehicle traffic data into a deep neural network that is configured to determine whether the vehicle traffic data satisfies one or more criteria for occurrence of the first event.

7. The method of claim 2, wherein generating the event data based on the recording includes:
selecting, for a respective vehicle of one or more vehicles in the first event, a respective value from a predetermined set of values for a first index corresponding to a behavior of the respective vehicle in the first event.

8. The method of claim 7, wherein generating the event data based on the recording includes:
determining, for the one or more vehicles in the first event, an aggregated value for a second index corresponding to a complexity of the first event.

9. The method of claim 8, wherein determining the aggregated value includes:
aggregating one or more respective values for the first index, from the one or more vehicles in the first event, to obtain the aggregated value.

10. The method of claim 8, further comprising:
in accordance with a determination that the aggregated value satisfies a threshold value:
retaining the recording; and
generating the event data based on the recording.

11. The method of claim 2, wherein:
the recording comprises a first data format; and
generating the event data based on the recording includes converting the recording having the first data format to the event data having a second data format that is different from the first data format.

12. The method of claim 11, wherein the event data having the second data format has a smaller file size than the recording having the first data format.

13. The method of claim 11, wherein the second data format comprises a processed bird's-eye view (BEV) data format.

14. The method of claim 11, wherein the recording having the second data format comprises vectorized data with timestamps.

15. The method of claim 2, wherein the recording of the first event is recorded for at least a predefined time duration.

16. The method of claim 2, wherein:
the first event involves a first vehicle; and
the method further includes transmitting the recording of the first event to the first vehicle.

17. A computer system for automatic event capturing, comprising:
a plurality of sensors that are positioned on a fixed installation at a road;
one or more processors; and
memory coupled to the one or more processors, the memory storing one or more programs configured for execution by the one or more processors, the one or more programs including instructions for:
monitoring, by the plurality of sensors on the fixed installation, vehicle traffic data in a zone of interest of the road over a period of time to generate historical traffic data, wherein the zone of interest is of a first type;
using the historical traffic data to train a driving model of an at least partially autonomous vehicle; and
sending the driving model to one or more vehicles, wherein the driving model is configured to be used by the one or more vehicles to at least partially autonomously drive in a first trajectory while the one or more vehicles are traveling through a zone of the first type and wherein the driving model supplements an existing vehicle control system that is controlling the one or more vehicles and is only used while the one or more vehicles are traveling through the zone of the first type.

18. The computer system of claim 17, wherein the computer system includes one or more distinct systems located at distinct locations of the road.

19. A non-transitory computer-readable storage medium storing one or more programs configured for execution by one or more processors of a computer system that includes a plurality of sensors that are positioned on a fixed installation at a road, one or more processors, and memory, the one or more programs comprising instructions for:
monitoring, by the plurality of sensors on the fixed installation, vehicle traffic data in a zone of interest of the road over a period of time to generate historical traffic data, wherein the zone of interest is of a first type;
using the historical traffic data to train a driving model of an at least partially autonomous vehicle; and
sending the driving model to one or more vehicles, wherein the driving model is configured to be used by the one or more vehicles to at least partially autonomously drive in a first trajectory while the one or more vehicles are traveling through a zone of the first type and wherein the driving model supplements an existing vehicle control system that is controlling the one or more vehicles and is only used while the one or more vehicles are traveling through the zone of the first type.

20. The non-transitory computer-readable storage medium of claim 19, the one or more programs further comprising instructions for:
receiving vehicle operational data from one or more vehicles that are traveling in the zone of interest of the road over the period of time; and
using the vehicle operational data to generate the historical traffic data.

* * * * *